US012378815B2

(12) United States Patent
Nelissen

(10) Patent No.: US 12,378,815 B2
(45) Date of Patent: Aug. 5, 2025

(54) WINDOW COVERING

(71) Applicant: Peter Nelissen, Barendrecht (NL)

(72) Inventor: Peter Nelissen, Barendrecht (NL)

( * ) Notice: Subject to any disclaimer, the term of this patent is extended or adjusted under 35 U.S.C. 154(b) by 254 days.

(21) Appl. No.: 17/957,657

(22) Filed: Sep. 30, 2022

(65) Prior Publication Data

US 2023/0313603 A1 Oct. 5, 2023

(30) Foreign Application Priority Data

Mar. 29, 2022 (CA) ...................................... 3154632

(51) Int. Cl.

*E06B 9/262* (2006.01)
*E06B 9/266* (2006.01)
*E06B 9/58* (2006.01)

(52) U.S. Cl.

CPC .............. *E06B 9/262* (2013.01); *E06B 9/266* (2013.01); *E06B 2009/2625* (2013.01); *E06B 2009/2627* (2013.01); *E06B 2009/583* (2013.01)

(58) Field of Classification Search

CPC .. E06B 9/262; E06B 9/266; E06B 2009/2625; E06B 2009/2627; E06B 2009/3222; E06B 2009/2423; E06B 2009/2441; E06B 9/30; E06B 9/32; E06B 9/322; E06B 2009/543
See application file for complete search history.

(56) References Cited

U.S. PATENT DOCUMENTS 4,557,309 A * 12/1985 Judkins ..................... E06B 9/32 160/279
4,733,711 A * 3/1988 Schon ..................... E06B 9/327 160/279
5,533,559 A * 7/1996 Judkins ................... E06B 9/327 160/172 R
6,047,759 A 4/2000 Lysyj
6,644,373 B2 * 11/2003 Palmer .................... E06B 9/322 160/192
7,143,802 B2 12/2006 Strand et al.
8,074,698 B2 12/2011 Allsopp
(Continued)

FOREIGN PATENT DOCUMENTS

AU 2007201248 A1 5/2008
EP 3312376 A1 4/2018
(Continued)

*Primary Examiner* — Daniel P Cahn
*Assistant Examiner* — Matthew R. Shepherd
(74) *Attorney, Agent, or Firm* — The Webb Law Firm

(57) ABSTRACT

The present invention relates to a window covering that includes a frame, a panel section inside the frame, and two separate cord pulley systems, where the panel section includes two rails with a panel in between, and where one of the two cord pulley systems enables the one of the two rails to be moved along inside the frame and the other of the two cord pulley systems enables the other of the two rails to be moved along inside the frame. The window covering frame of the present invention enables installation over a window or door frame through attachment means on the outer back frame, such as sticky tape, or through attachment means on the back frame and corresponding attachment means on a door or window frame, such as corresponding magnetic strips or a strip with hooks and a strip with corresponding loops.

14 Claims, 26 Drawing Sheets

(56) References Cited

U.S. PATENT DOCUMENTS

| | | | | |
|---|---|---|---|---|
| 9,988,837 | B2 | 6/2018 | Defenbaugh et al. | |
| 10,626,667 | B2 | 4/2020 | Schulman | |
| 11,002,069 | B2 * | 5/2021 | Dekker | E06B 9/327 |
| 2002/0033241 | A1 * | 3/2002 | Palmer | E06B 9/322 160/192 |
| 2003/0085002 | A1 * | 5/2003 | Palmer | E06B 9/322 160/168.1 R |
| 2004/0016513 | A1 * | 1/2004 | Hung | E06B 9/32 160/84.06 |
| 2004/0016514 | A1 * | 1/2004 | Nien | E06B 9/32 160/115 |
| 2006/0032160 | A1 * | 2/2006 | Gazaway | E06B 5/12 160/172 R |
| 2006/0180277 | A1 * | 8/2006 | Lin | E06B 9/262 160/84.04 |
| 2006/0196612 | A1 * | 9/2006 | Strand | E06B 9/32 160/84.05 |
| 2006/0231214 | A1 * | 10/2006 | Whyte | E06B 9/262 160/84.04 |
| 2007/0068636 | A1 * | 3/2007 | Yu | E06B 9/322 160/168.1 R |
| 2008/0163988 | A1 * | 7/2008 | Hicks | E06B 9/54 160/267.1 |
| 2011/0005690 | A1 * | 1/2011 | Harding | E06B 9/262 160/84.03 |
| 2013/0008616 | A1 * | 1/2013 | Huang | E06B 9/327 160/84.01 |
| 2013/0299103 | A1 * | 11/2013 | Anderson | E06B 9/322 160/331 |
| 2016/0138330 | A1 * | 5/2016 | Huang | E06B 9/323 160/170 |
| 2019/0017318 | A1 * | 1/2019 | Smith | E06B 9/42 |
| 2022/0170319 | A1 * | 6/2022 | Chen | E06B 9/388 |
| 2022/0220802 | A1 * | 7/2022 | Grützner | E06B 9/322 |
| 2023/0332463 | A1 * | 10/2023 | Scholz | E06B 9/80 |

FOREIGN PATENT DOCUMENTS

| | | | |
|---|---|---|---|
| EP | 3431698 | A1 | 1/2019 |
| KR | 10-2010-0134397 | A | 12/2010 |
| KR | 10-2017-0130143 | A | 11/2017 |

* cited by examiner

WINDOW COVERING

CROSS-REFERENCE TO RELATED APPLICATION

This application claims priority to Canadian Patent Application No. 3154632 filed Mar. 29, 2022, the disclosure of which is hereby incorporated by reference in its entirety.

BACKGROUND OF THE INVENTION

Field of the Invention

The present invention relates to a window covering, and more specifically to a cordless window covering that may be raised and lowered from its top and bottom.

Description of Related Art

Manually operated, window shades, blinds or coverings can be classified as either cord or cordless. Even though mass production techniques have reduced the price, cord and cordless window coverings are relatively expensive and typically require installation by trained installers using brackets as fasteners on a door or window. The cords hanging down from the sides of a cord type shade are aesthetically unpleasing, especially so in window installations where several windows are adjacent one another. The most serious drawback, however, is the safety hazard caused by the dangling cords to children and pets such that accidental choking or hanging may occur.

There are numerous lock and clutch mechanisms used with cord shades, and many clutch mechanisms utilize springs to assist in raising or lowering the shades. There are numerous cordless mechanisms for winding the cords about a stationary capstan and numerous mechanisms for laterally moving the capstan.

In the cordless type, the weight of the fabrics limits the size of the shade or blind that can be made, with a large top rail that contrasts with a smaller bottom rail and usually operate with a spring assist mechanism that is enclosed in a metal tube or are motorized which make the shade or blind very expensive such that the average consumer may not be able to afford to purchase it.

Window coverings such as shades and blinds are available with various blind materials, including fabrics of various kinds. In this way the user can adjust the colour or thickness of the covering to provide light or dark effects. Most of such coverings have controls by which the entire covering panel, i.e., a rectangle of covering, is raised or lowered.

U.S. Pat. No. 6,047,759 describes a conventional cordless window shade with two lift cords running vertically and parallel to each other in the shade with a wrap mechanism on the roller bar to allow the lift cords to uniformly wrap around the roller bar, and since the top of each lift cord is wrapped about the shade roller bar this obviates using capstans or pulleys. This window shade is mounted to the frame of the window by conventional brackets which mount to the window frame and can be attached to top rail in any number of known mounting arrangements. This shade has a larger top rail than bottom rail. The entire shade is raised from the bottom to the top.

U.S. Pat. No. 7,143,802 describes a motorized cordless window blind assembly similar in mechanics to the above but with an intermediate rail suspended below the headrail and bottom rail and window covering material extends between the intermediate rail and the bottom rail. The patent states that it is believed that independent movement of the intermediate rail and the bottom rail enables selected regions of a window opening to be covered, while other portions remain uncovered. For example, a user may desire to cover a lower portion of a window opening while providing visual access through an upper portion of the window covering. This blind uses a roller bar to roll up the lift cords. This window shade is mounted with a mounting bracket and mounting screws for mounting the headrail over a window opening. This shade has a larger top rail than bottom rail. The shade is raised by a roller tube acting as an accumulator to roll up the lift cords.

Australian Patent 2007201248 describes a cordless blind having a compartment within the top rail which had a winding drum (rather than roller bar) for winding a suspension cord. Since this window covering is pulled down by the bottom rail, it must be secured to a window or wall by the top rail. The top rail is larger than the bottom rail.

South Korean patent publication KR20100134397 describes a corded blind in a window having two panes of glass and a frame. There are two lift cords in the blind with two winding rolls, respectively, and a side cord on a pulley, which side cord hangs out of the frame. This window shade is inside a window and the entire shade is raised from the bottom to the top by a cord.

U.S. Pat. No. 8,074,698 describes at least one frame securing clip, akin to a mounting bracket, for releasably securing a blind in a frame to a window frame. The blind has two lift cords running vertically and parallel to each other in the blind which is pushed up to open it within the frame. There is no top rail and bottom rail per se, but rather the top of the frame is like the top rail and a small handle on the bottom of the blind is like the bottom rail.

U.S. Pat. No. 9,988,837 describes a motorized blind with at least two lift cords running vertically and parallel to each other in the blind, each lift cord being supported by a lift spool assembly. This blind's head rail may be mounted to a window frame or other architectural feature by mounting brackets or other mounting mechanism to cover the window or other opening. This shade has a larger top rail than bottom rail. The entire shade is raised from the bottom to the top.

South Korean patent publication KR20170130143 describes a motorized blind/screen with a top screen rolling pipe for rolling up the screen and a bottom end pipe. The entire shade is raised from the bottom to the top. There are magnets at the outer edges of the screen and corresponding magnets on the door frame to shield against heat cold etc.

U.S. Pat. No. 10,626,667 describes an operating system for a motorized window covering. This window covering may have at least two lift cords running vertically and parallel to each other in the window covering, each lift cord being supported by a lift spool assembly. This window covering's head rail may be mounted to a window frame or other architectural feature. The panel may be supported by lift cords to raise and lower the panel relative to the head rail. The top rail contains the mechanicals, and the bottom rail is not shown.

European patent 3,312,376 describes a blind in a support frame intended to be fixed to a load-bearing element, such as a wall with an opening. The support frame comprises a rolling-shutter box, akin to a top rail, susceptible of being fixed to a wall of the load-bearing element preferably by means of anchorage brackets. The blind also comprises a take-up roller rotatably constrained to the support frame, advantageously housed within the rolling-shutter box. The blind also comprises a flexible fabric (such as a mosquito screen), which is susceptible of being wound and unwound around the take-up roller and preferably passes through a passage slit of the rolling-shutter box to enter into and exit from the latter. The blind also comprises two lateral guides extended parallel to each other and side-by-side and placed to delimit corresponding sides of the opening, which lateral guides are connected by a transverse bar, akin to a bottom rail, at the bottom of the fabric. Between the lateral guides, the fabric is susceptible of sliding following its winding and unwinding around the take-up roller. This blind has a larger top rail (rolling-shutter box) than bottom rail (transverse bar). The fabric is raised from the bottom to the top.

European patent 3,431,698 describes a fabric roller blind in a support frame provided with at least one lateral upright (top rail) and intended to be fixed to the load-bearing structure in which the opening is obtained. The support frame can be fixed to the load-bearing structure at the opening by embedding it within the masonry or wooden section or fixed with front mounting on the internal or external face of the building wall in which the opening is made. The lateral upright comprises a rolling-shutter box with a hollow tubular body, in which fabric is wound around a take-up roller passes through a vertical slit which is made on a lateral wall of the rolling-shutter box. The blind also comprises a handle bar (lower rail), to which the second lateral edge of the fabric is fixed. Advantageously, the handle bar is made with a hollow tubular body, and the handle bar moves from the top (blind open) to the bottom along racks on each side. This involves considerable hardware to effect. The top rail is larger than the bottom rail.

What is needed is a safe, affordable cordless window covering which can be opened at the bottom or top or both the top and bottom, is installable without mounting brackets, and doesn't need to have aesthetically unpleasing differently sized rails.

SUMMARY OF THE INVENTION

The present invention is a window covering comprising a frame in which there are two rails with a panel in between, wherein one rail is movable through a first cord pulley system and the other rail is movable through a second separate cord pulley system.

In an embodiment of the invention, there is a window covering comprising a frame, a panel section inside the frame, and two cord pulley systems, wherein the frame has a front, a back, four sides and four corners, wherein the panel section comprises two rails with a panel in between, and wherein one of the two cord pulley systems enables the one of the two rails to be moved along inside the frame and the other of the two cord pulley systems enables the other of the two rails to be moved along inside the frame.

In an embodiment of invention, the two cord pulley systems comprise a cord, cord holders in two adjacent corners and a spring on the rail for holding a cord. In an embodiment of invention, each of the springs is held within a cradle. In an embodiment of invention, each of the rails has a cord guide at each end. In an embodiment of invention, the frame back additionally comprises a window covering attachment means for attaching the back of the frame to a frame for a door or window.

In an embodiment of the invention, the frame additionally comprises an open inner channel so that the cords run along inside the channel. In a further embodiment grooved end plates and/or the cord holder push the cords further into the channel.

In an embodiment of invention, there is a window covering comprising a frame, a panel section inside the frame, a top cord pulley system and a bottom cord pulley system, wherein the frame has a front, a back, four sides and four corners, wherein the panel section comprises a top rail and a bottom rail with a panel in between, and each of the rails comprises a base with a right base hole and a left base hole, wherein the top and the bottom cord pulley systems each comprise a continuous loop of cord, a cord holder in a right corner and a cord holder in a left corner, a spring in the base of each rail, which spring has a right hook at one end and a left hook at the other end, and wherein for each cord pulley system the cord exits the right cord holder, passes in through the right side of the rail, loops around the right hook of the spring, passes through the right base hole, under the rail, up through the left base hole, loops around the left hook, passes out the left side of the rail, enters the left cord holder, exits the left cord holder, passes in through the left side of the rail, through right base hole, under the rail, up through left base hole, passes out through the end of the right rail, and enters the right cord holder.

In an embodiment of invention, the window covering additionally comprises two cradles and each cradle holds one of the springs.

In an embodiment of invention, the window covering additionally comprises a cord guide at the end of each rail, wherein the cord guide has one hole for holding the cord passing in through the rail and one hole for holding the cord passing out through the rail.

In an embodiment of invention, each cord holder has either two separate holes for the cord to enter and exit or one hole for the cord to enter and exit, which holes are adjacent the inside of the frame so that the cords run along the insides of the frame, and if the frame has an inner channel so that the cords run along the channel.

In an embodiment of invention, the frame sides that are substantially parallel to the rails additionally comprise a cord holder channel and the cord holder additionally comprises a base capable of slidable engaging with the cord holder channel.

In an embodiment of invention, the window covering additionally comprises a cover to cover each rail, and wherein each cover has a hole at the right end and a hole at the left end for the cords to pass through to the cord guide.

In an embodiment of invention, the back of each frame side has a mitered corner with a corner key groove and each frame side substantially parallel to the rails is joined to the frame side substantially perpendicular to the rails through a corner key inserted into the corner key groove at each corner so as to line up the corner key groove of adjacent frame sides, and wherein there is a tightened screw in the corner key at each end of each frame side. In an alternate embodiment of the invention, each corner comprises a corner cover having two corner cover inserts extending from the corner cover at right angles, and wherein each frame side ends in a straight cut with a corner cover insert in the end of each frame side to join adjacent frame sides together.

In an embodiment of invention, the frame back additionally comprises a window covering attachment means for attaching the back of the frame to a frame for a door or window. The window covering attachment means may be selected from double sided tape, glue and dap. The window covering attachment means may be a magnetic strip capable of magnetically attaching to a corresponding magnetic strip on the frame. The window covering attachment means may be capable of attaching to a corresponding frame attachment means and the attachment means may be corresponding hooks and loops which adhere when pressed together and can also be pulled apart.

In an embodiment of invention, the window covering further comprises a handle on the top rail and a handle on the bottom rail.

In an embodiment of invention, the panel may be of a honeycomb style.

The window covering may comprises a top rail of the same size as the bottom rail.

In an embodiment of invention, there is a kit for making a window covering comprising four sides of a frame, four cord holders, and two rails, wherein each of the rails comprises a base holding a spring in a cradle and a hole on either side of the cradle.

In an embodiment of the invention, the frame additionally comprises an open inner channel so that the cords run along inside the channel.

In a further embodiment there are grooved end plates on each end of the rails and each grooved end plate comprises one hole above which is one groove, and the cord passes through the hole and along the groove, which groove directs the cord into the channel of the frame of the window covering. The cord holder may also be shaped so that a hole for the cord pushes the cord into the channel.

BRIEF DESCRIPTION OF THE DRAWINGS

These and other aspects of the present invention will be apparent from the brief description of the drawings and the following detailed description in which.

DESCRIPTION OF THE INVENTION

Figure 1:
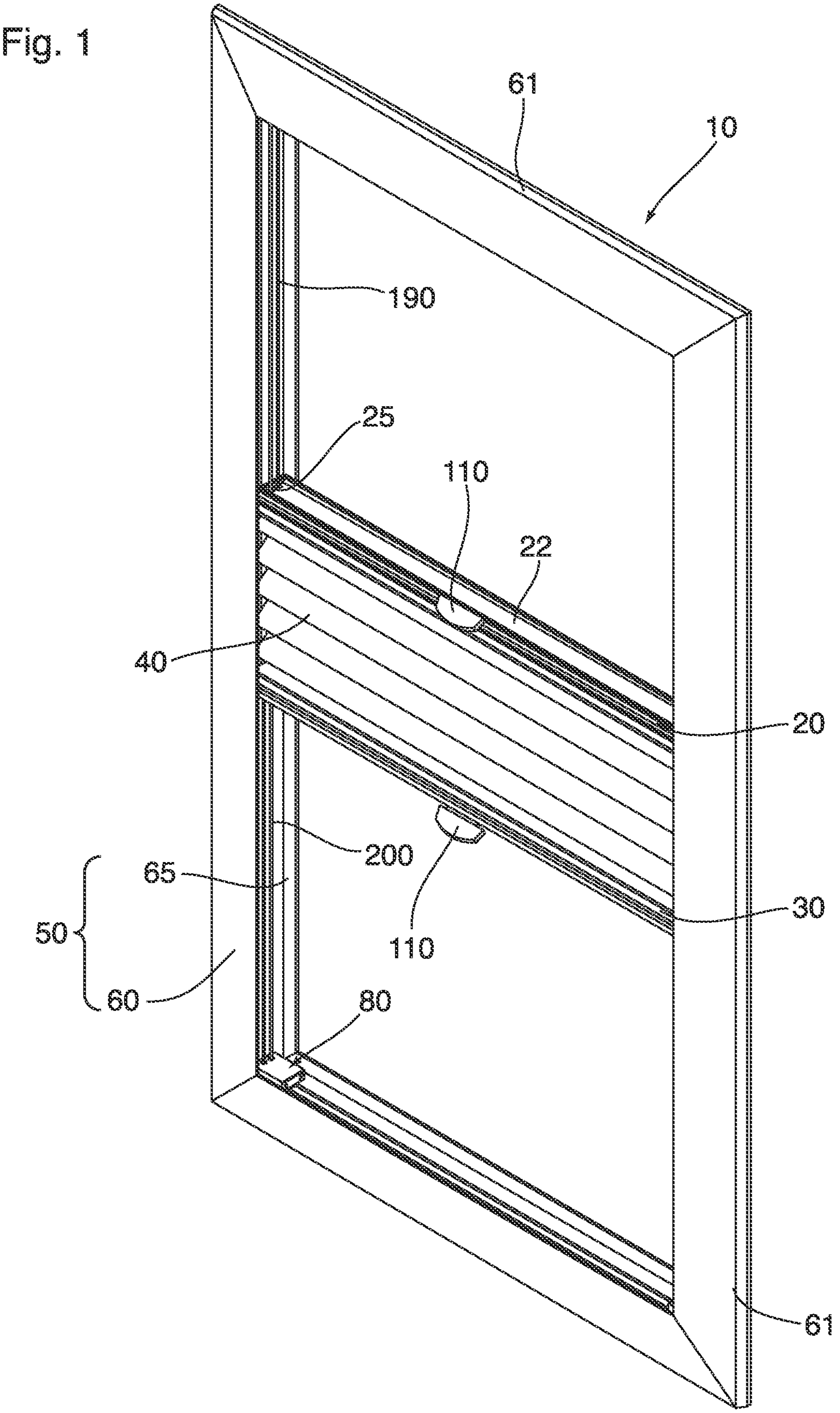
FIG. 1 is a front perspective view of an embodiment of a window covering of the present invention.

As seen in an embodiment of the present invention shown in FIG. 1, the window covering 10 comprises a top rail 20 with rail cover 22, and bottom rail 30 with a panel 40 in between the rails 20, 30, all of which is within a frame 50. Reference is made to a top rail 20 and bottom rail 30 for purposes of description since the window covering works in either orientation and the separate cord pulley systems for both rails are the same. The rails 20,30 are substantially parallel to one another. The window covering 10 is cordless since no cords are hanging from it, but rather are contained tautly within the frame 50. The frame 50 is comprised of an outer frame face 60, outer frame edges 61, inner back frame 65, and outer back frame 68 (shown in FIGS. 7*e*, 7*f* and 8*b*).

Figure 2:
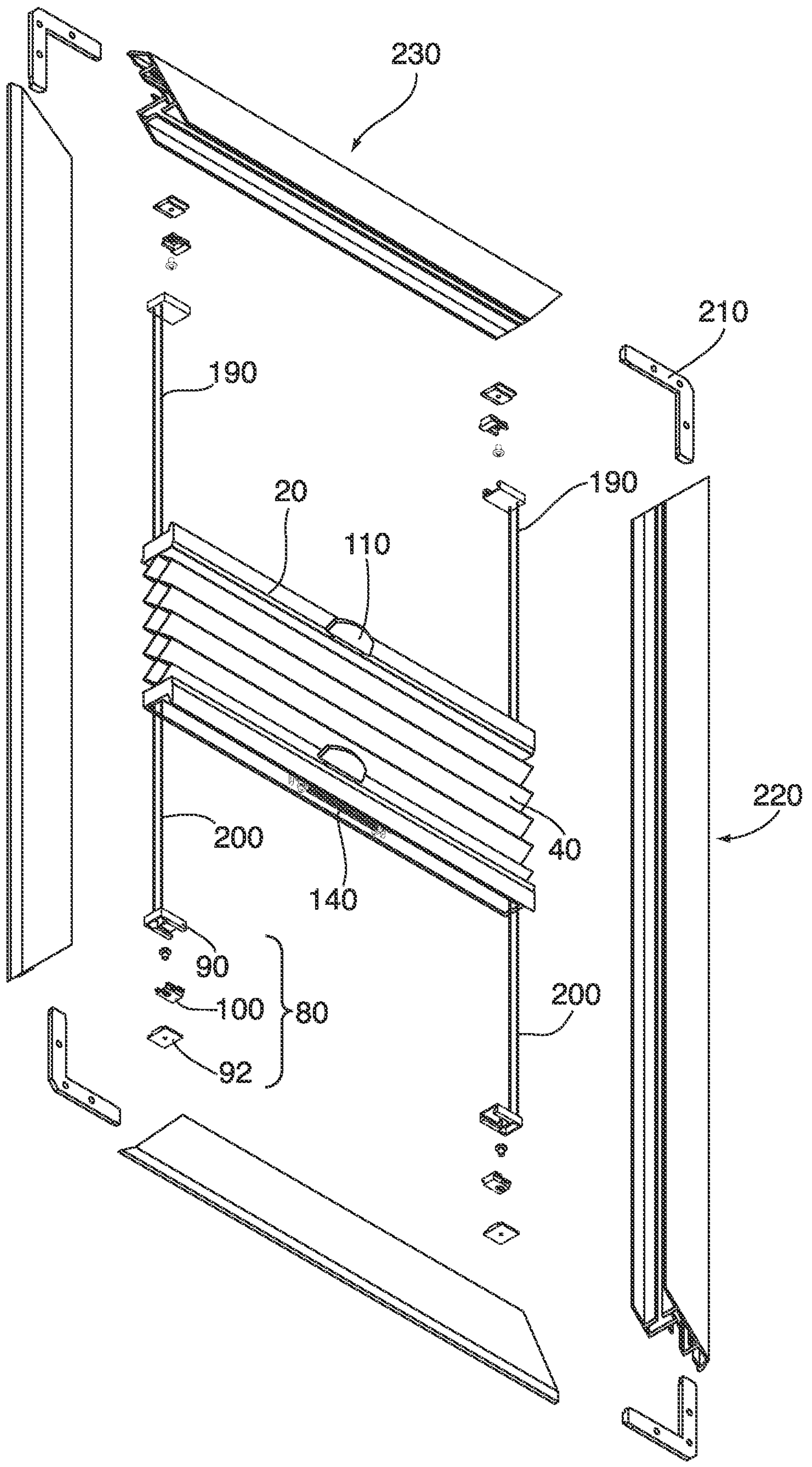
FIG. 2 is an exploded perspective view of the window covering of FIG. 1.

As seen in FIGS. 1 and 2, a cord 190 runs alongside the inside of frame 50 from a cord holder 80 in each top corner to the top rail 20. A cord 200 runs alongside the frame 50 from a cord holder 80 in each bottom corner to the bottom rail 30. The cords can be parachute cords or cords of other suitable materials.

There may be handles 110 on each rail 20, 30 to slide the panel 40 within the frame 50. However, this can also be done by gripping/pushing either or both of rails 20, 30 (and the rails 20, 30 in FIGS. 4*a*, 4*c* and 8*a* do not include handles 110). The panel may be opened or closed from the top rail 20, from the bottom rail 30 or from the first and bottom rail simultaneously.

FIG. 2 is an exploded view of the window covering 10 of FIG. 1. The frame 50 is assembled by joining the short frame sides 230 to the long frame sides 220 and kept in place with corner key 210 in each of the four corners. In other embodiments these sides may be the same length if the window covering 10 is square. In the embodiment shown in the figures the window covering 10 is rectangular, and the rails 20, 30 are substantially parallel to the short frame sides 230 and substantially perpendicular to the long frame sides 220. An embodiment of the cord holders 80 shown in FIG. 1 are shown in exploded view in FIG. 2 and in this embodiment the cord holder 80 comprises a base 92, joiner 100 and cap 90.

Figure 3A:
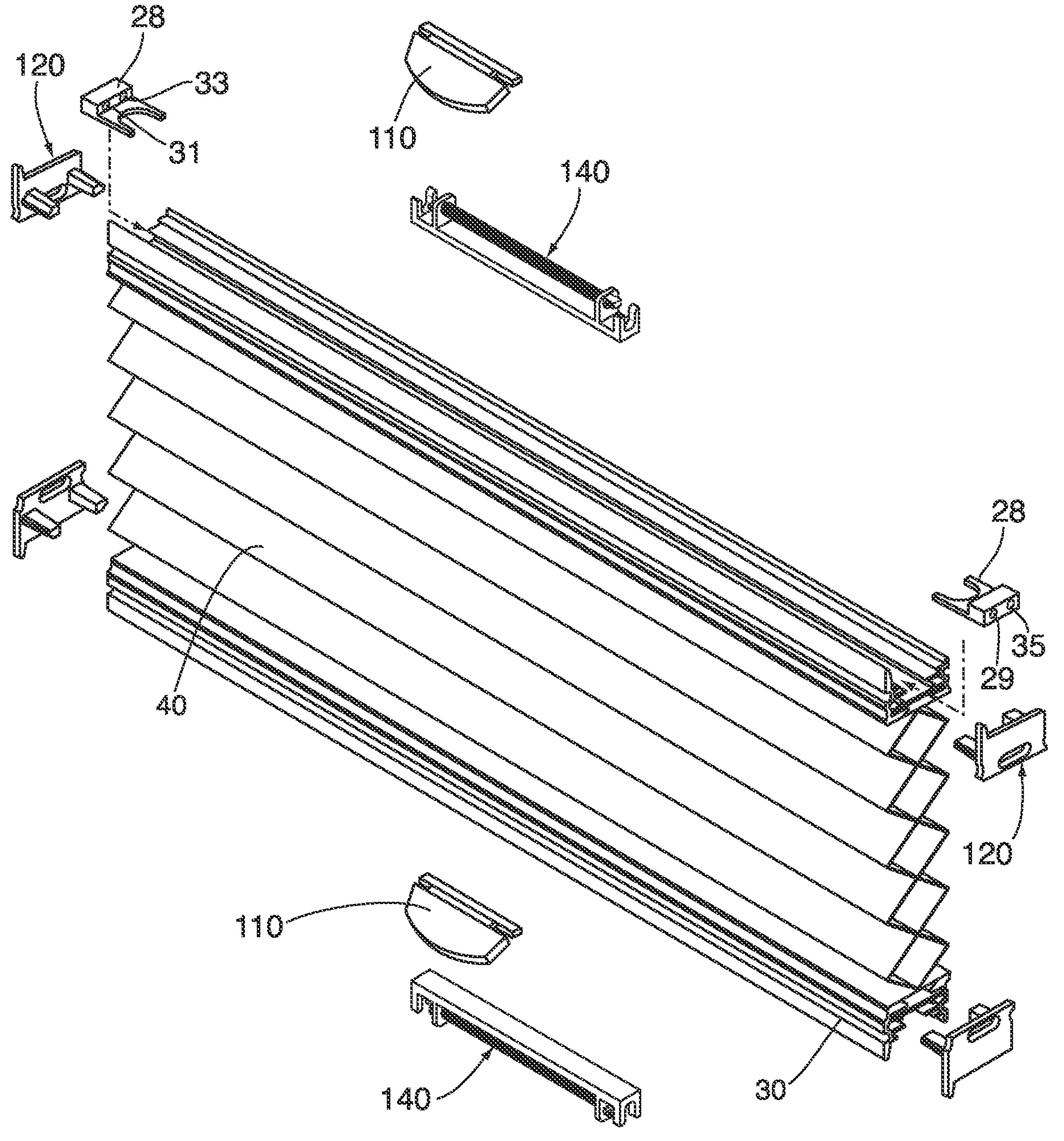
FIG. 3*a* is an exploded view of a panel portion of an embodiment of a window covering of the present invention.
Figure 3B:
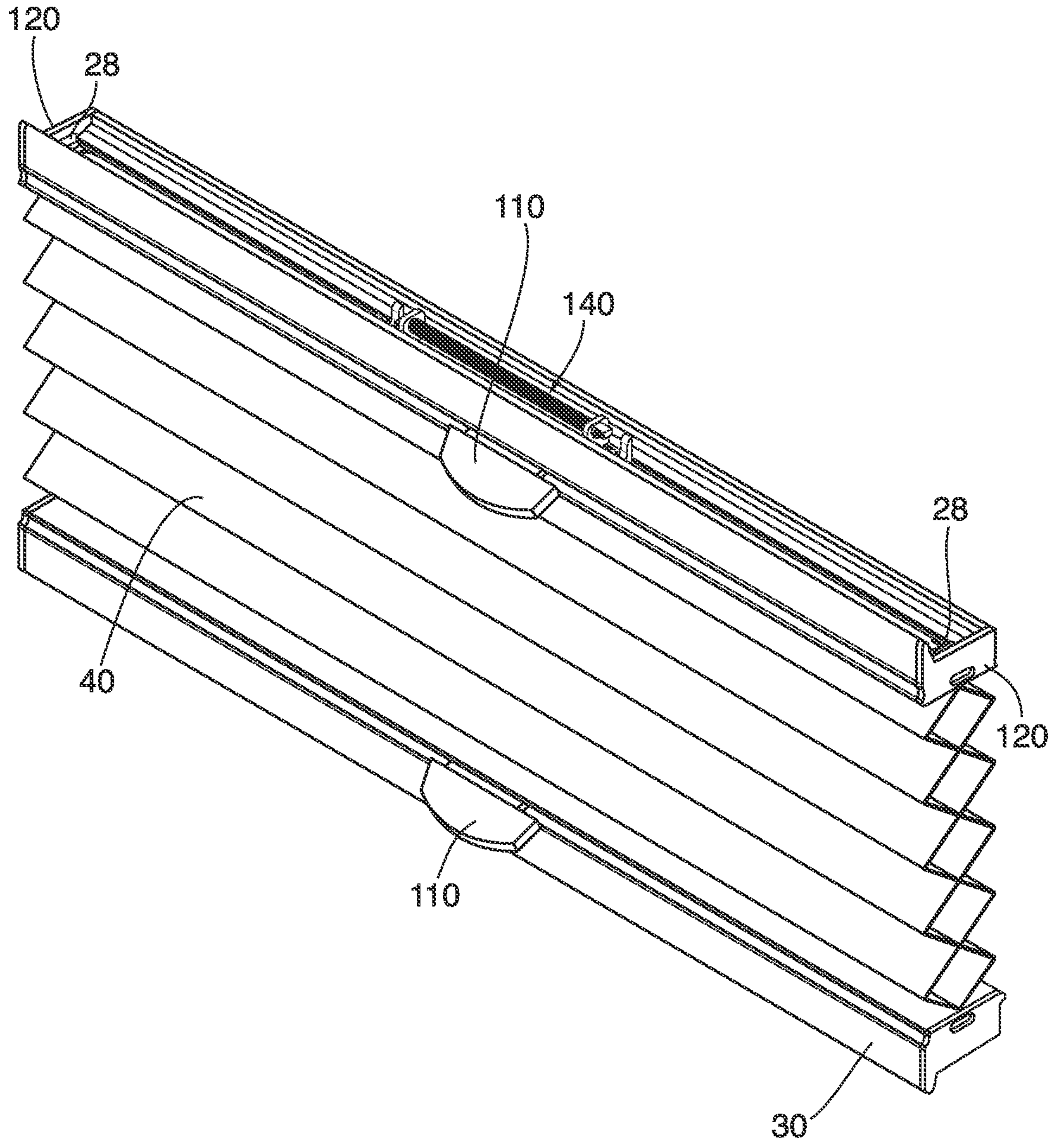
FIG. 3*b* is a perspective view of the panel section of the window covering of FIG. 3*a*.
Figure 3C:
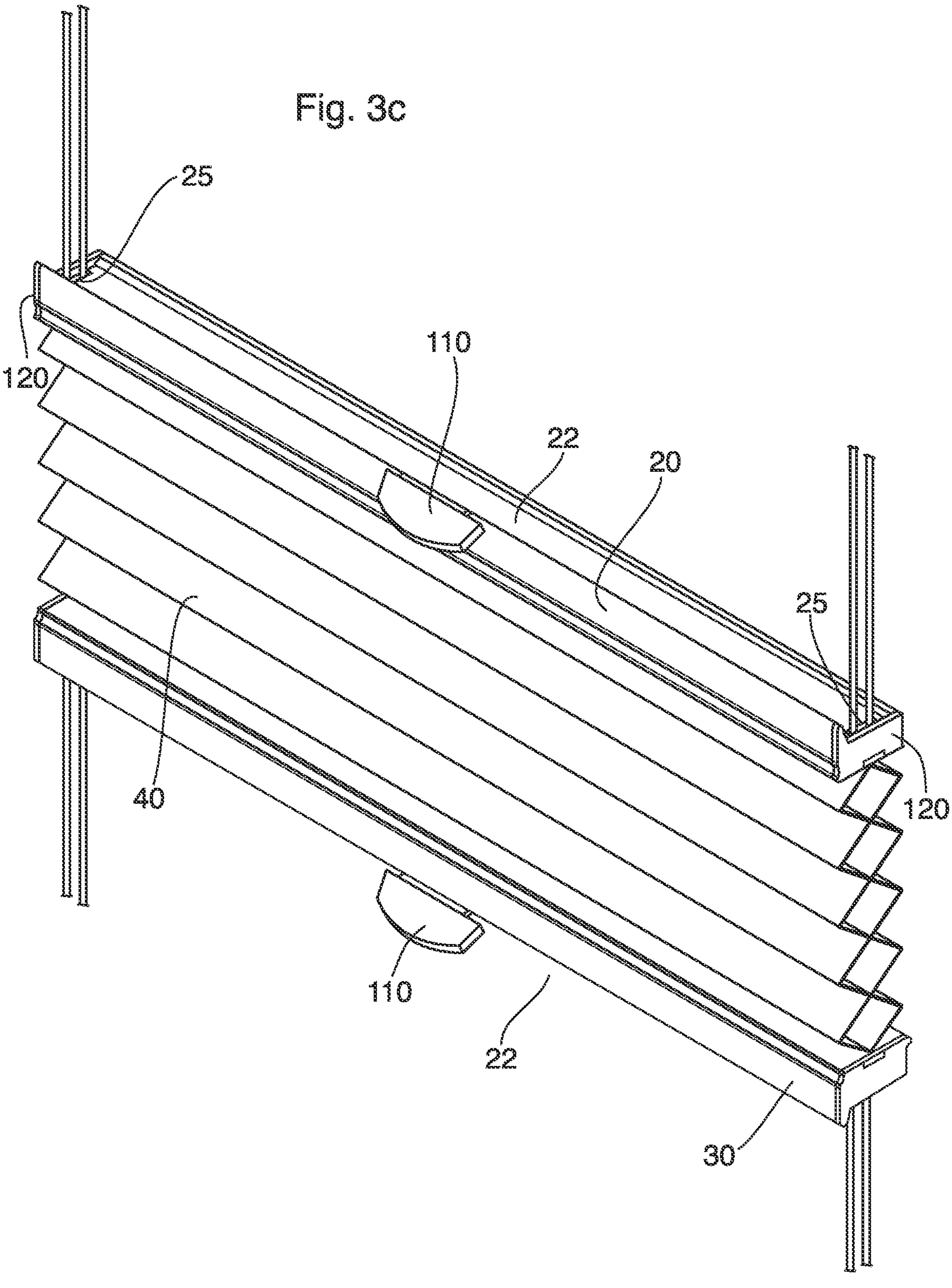
FIG. 3*c* is a perspective view of the panel section of the window covering of FIG. 3*a* with cords and rail cover.

As shown in FIGS. 3*a* and 3*b*, the top rail 20 and bottom rail 30 are the same in size and other details. The rails and the cord pulley systems are the same, but separate. At each end of the rails 20, 30 there is a cord guide 28 and an end plate 120. Within each rail 20, 30 is a cradle 140 for a spring. FIG. 3*c* shows the rail cover 22 which has rail cover holes 25 at each end for the cords 190, 200 to go through. The rail cover 22 is for aesthetic purposes and to avoid interference with the cords 190, 200 through touching and dirt. The rail cover 22 may be inserted into a groove in the top of the rail to maintain the rail cover 22 in place.

In this embodiment of the window covering 10, the panel 40 is shown in a honeycomb style, however, it will be understood that other styles of panel may be used, for example, other vertical styles, such as, honeycomb, and that the panel may be made of various fabrics or material that is preferably compressible between the top rail 20 and bottom rail 30 so that the window covering may be "opened" to the glass in a window or door that the window covering is covering. The rails 20, 30 may be made of any suitable material such as aluminum, metal, plastic, fiberglass, wood, or other materials.

Figure 4A:
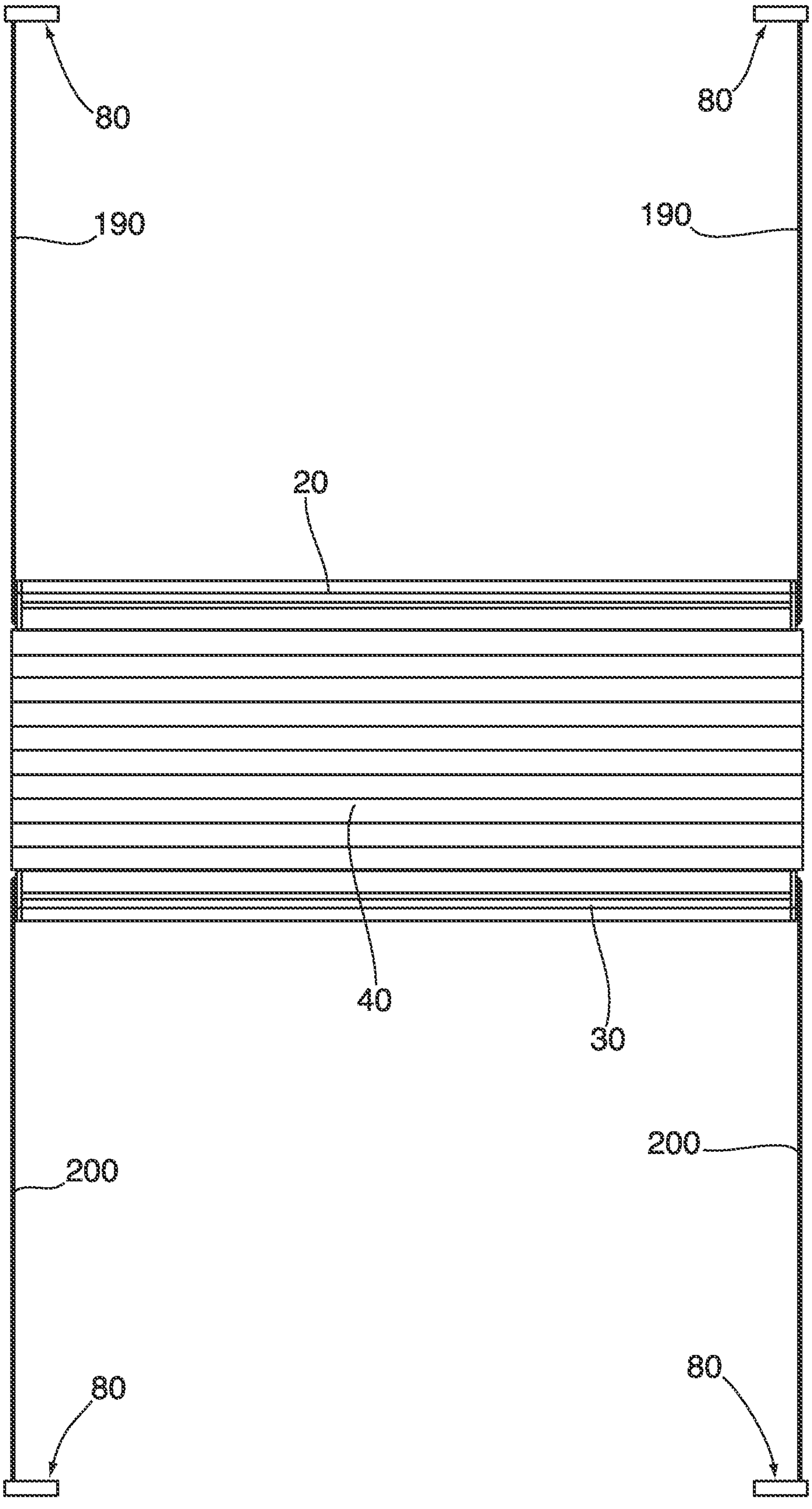
FIG. 4*a* is a front view of the panel section with cords of the window covering of FIG. 2.
Figure 4B:
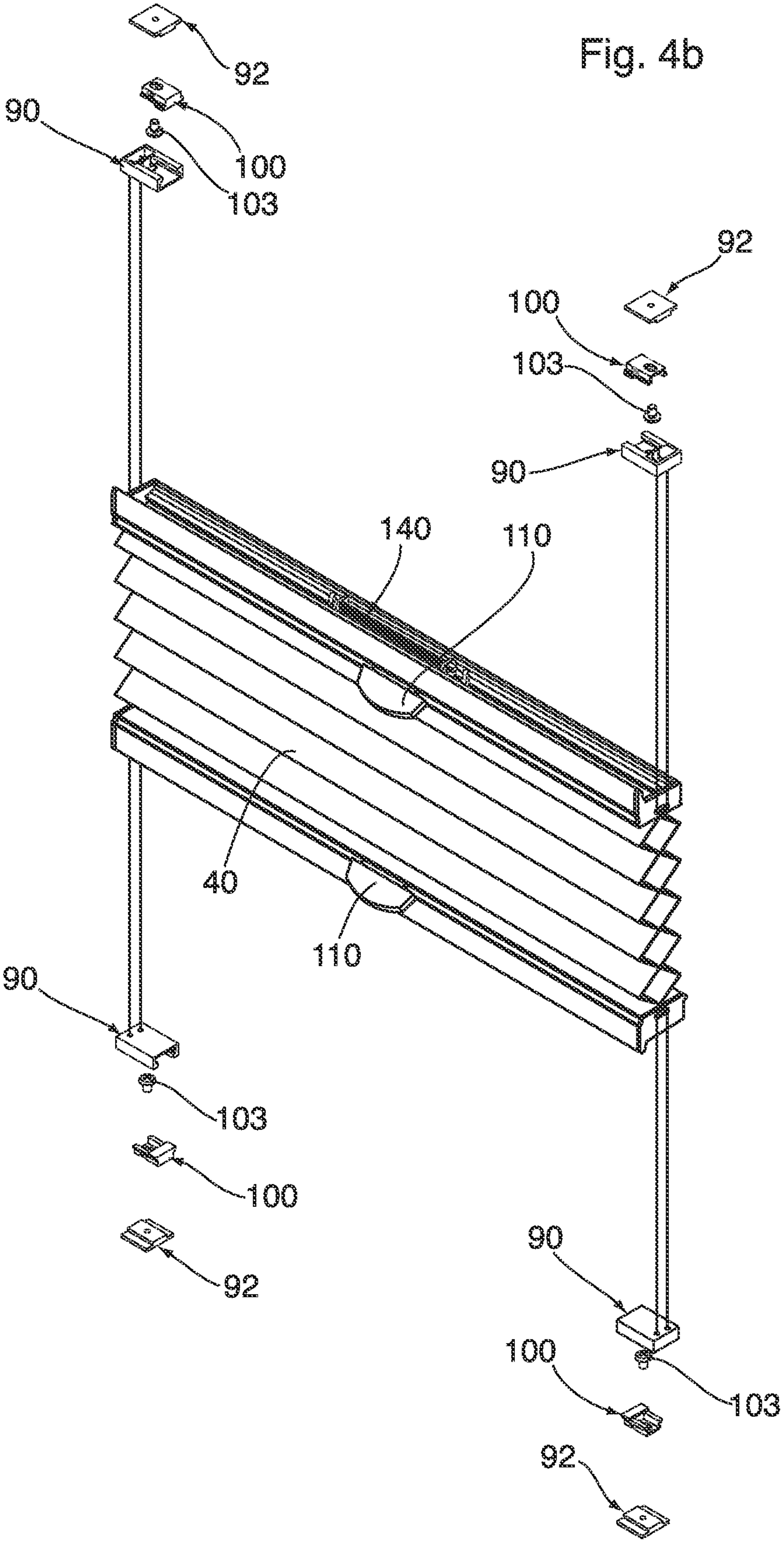
FIG. 4*b* is a perspective view of the panel section of the window covering of FIG. 2.
Figure 4C:
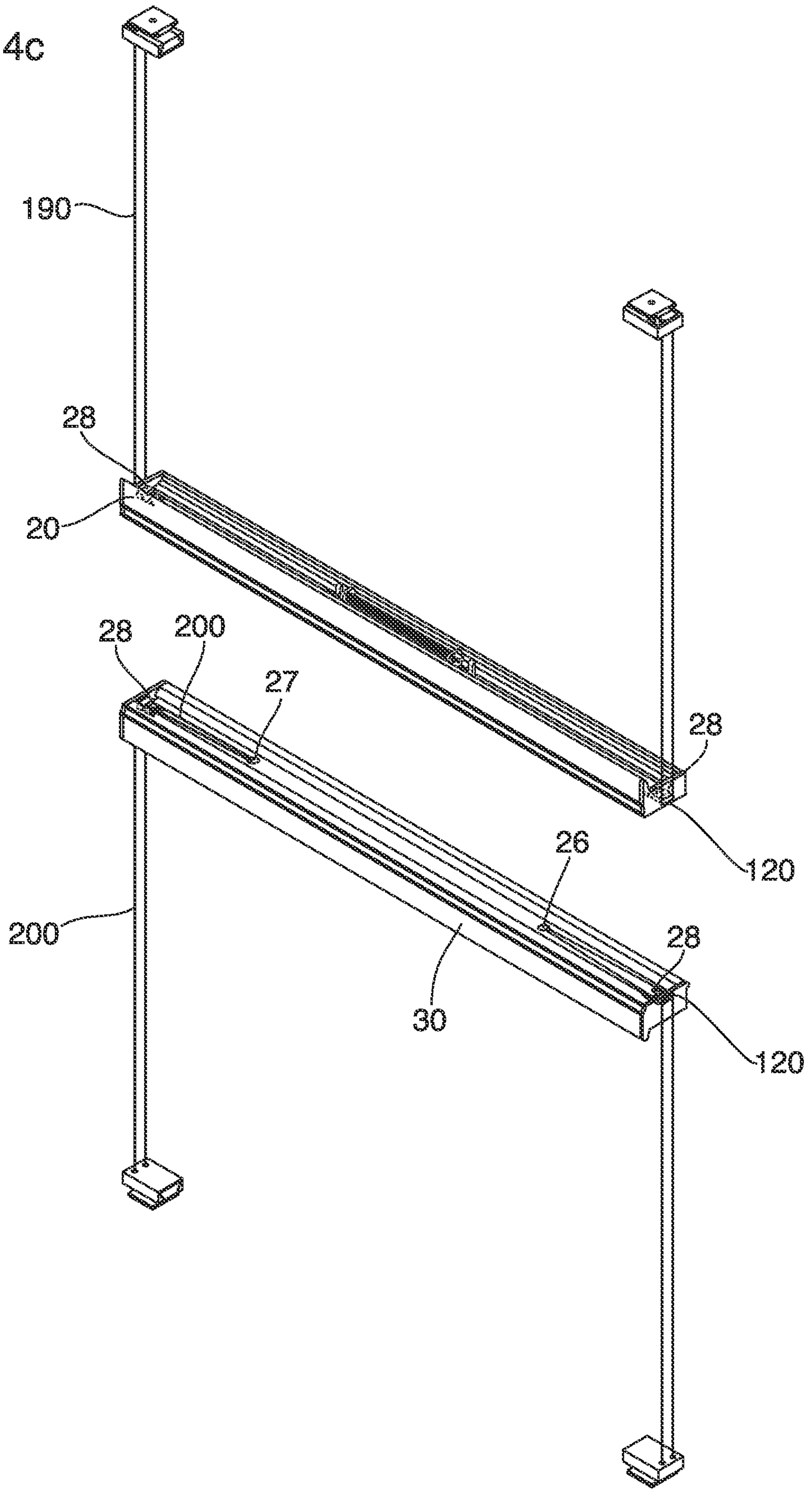
FIG. 4*c* is a perspective view of the panel section of the window covering of FIG. 4*a* without the panel.

FIGS. 4*a*, 4*b* and 4*c* show the cords 190 and 200 of the window covering 10 as if the frame 50 was holding the cord holders 80 in the corners of a frame (not shown here). As seen in FIG. 4*c*, there is a first cord 190 for the top rail 20 and a second cord 200 for the bottom rail 30, and the cords 190, 200 are separate. Cord 190 is a contiguous cord for the top rail 20 and cord 200 is a contiguous cord for the bottom rail 30. The cord 190 is looped through a cord holder 80 above each end of the top rail 20 in the top right corner and top left corner of the frame (not shown). The cord 200 is looped through a cord holder 80 below each end of the bottom rail 30 in the bottom right corner and the bottom left corner of the frame (not shown). In FIG. 4*c* the panel 40 has been removed to show that the cords 190 and 200 are separate and to show that bottom rail 30 is the upside-down version of the top rail 20. The separate cord pulley systems allow for the independent movement of the top rail 20 and bottom rail 30 and the raising and lowering of both the top rail 20 and bottom rail 30 may be done at the same time, or one may be moved and not the other.

Figure 4D:
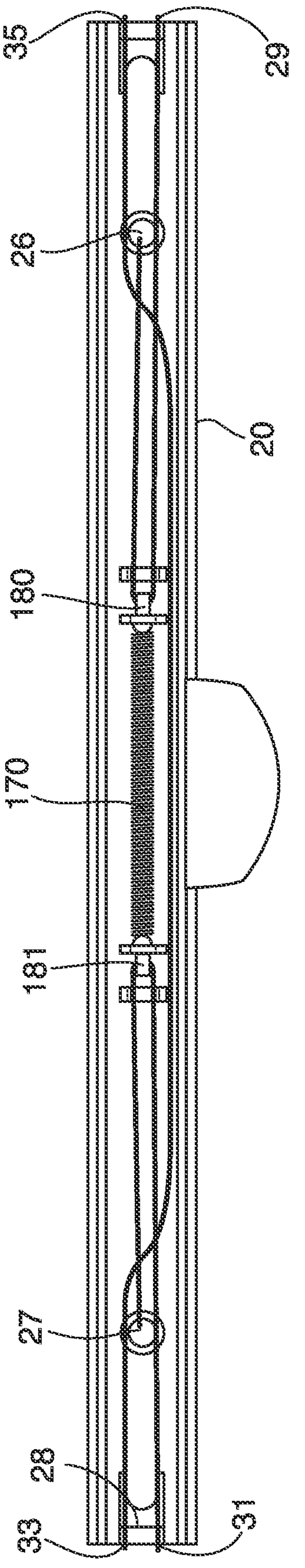
FIG. 4*d* is a top view of the rail of the window covering of FIG. 4*b*.

FIG. 4*d* shows the "top" of either top rail 20 or bottom rail 30, but for purposes of description will refer to top rail 20. Looking down at the top of the top rail 20 in FIG. 4*d*, components on the right side of the rail 20 are referred to as "right" and the left side as "left" for the purposes of this detailed description. As such, on the right is a first base hole 26 and first hook 180 and on the left is a second base hole 27 and second hook 181. However, the base holes, hooks and rail end cord holders are the same on each side. At both top corners of a window covering 10, two strands of cord 190 exit a cord holder 80 (not shown) and pass through rail cover holes 25 in a rail cover 22 (22 and 25 not shown here but shown in FIG. 3*c*) and through respective cord guide 28 through first right cord guide hole 29 and second right cord guide hole 35 on the right and through first left cord guide hole 31 and second left cord guide hole 33 on the left.

Figure 4E:
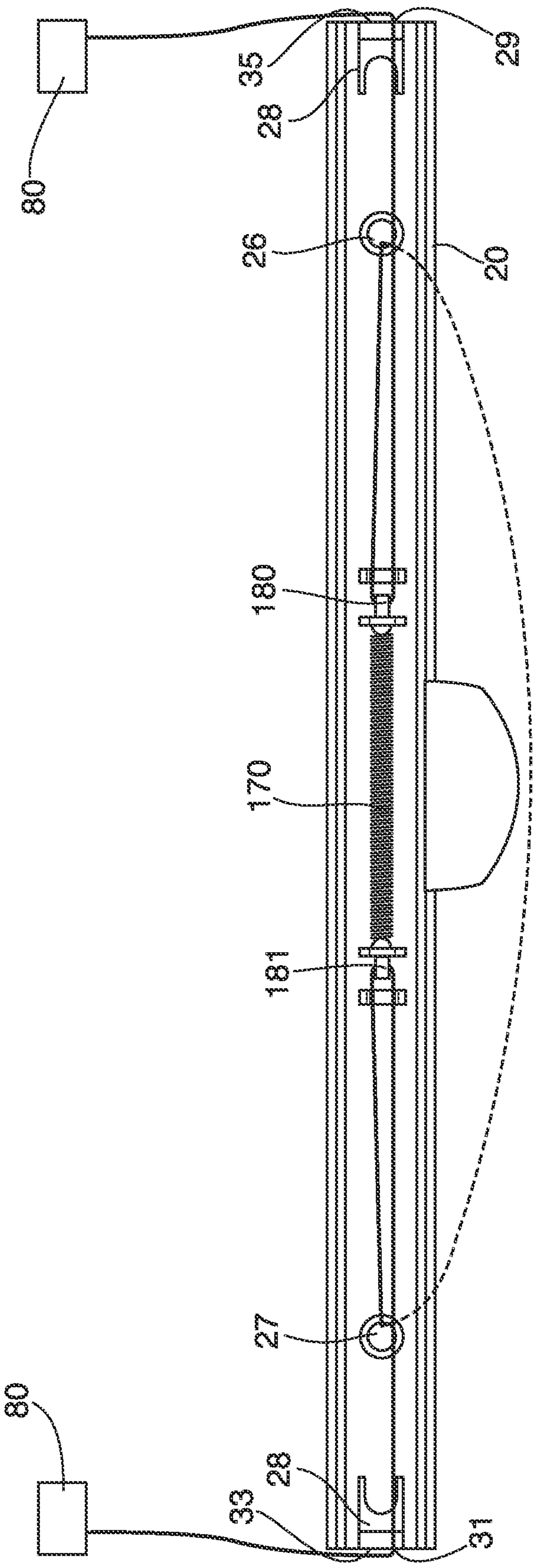
FIG. 4*e* is a top view of the rail of the window covering of FIG. 4*d* showing one section of the cord.
Figure 4F:
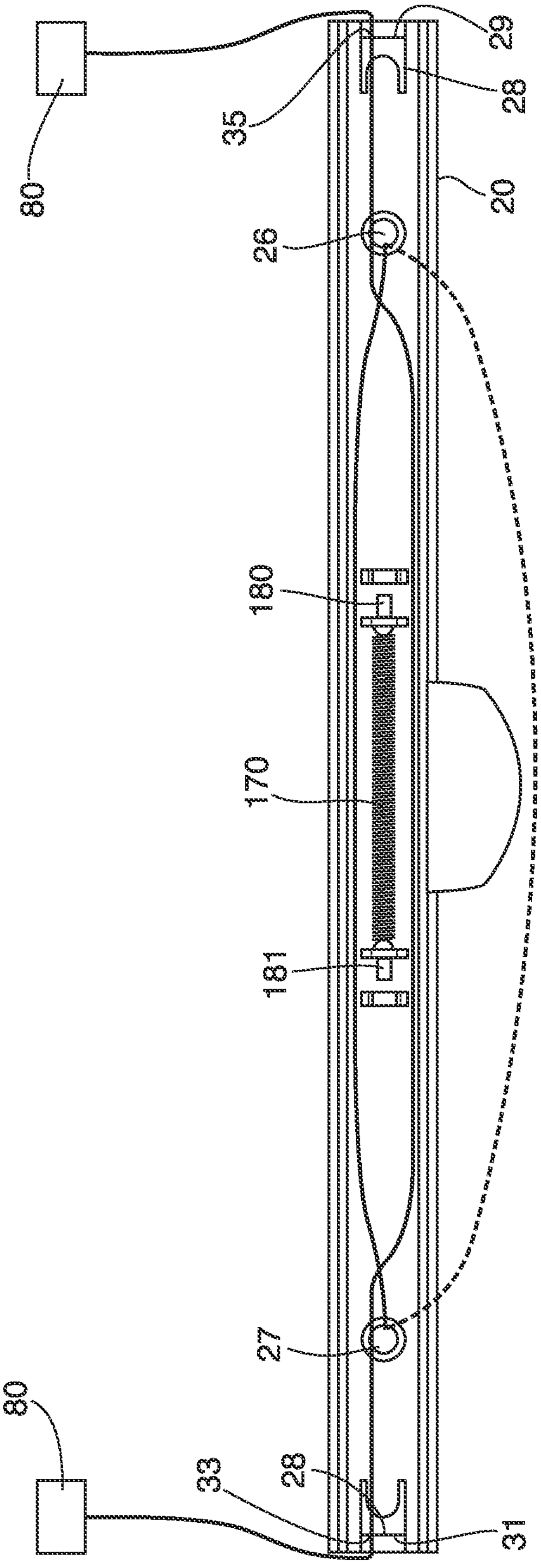
FIG. 4*f* is a top view of the rail of the window covering of FIG. 4*d* showing the other section of the cord.

FIGS. 4*e* and 4*f* depict the path of either cord 190 or cord 200 and for the purposes of this description will refer to rail 20 and cord 190, but it is understood that the same also applies to rail 30 and cord 200. For purposes of illustration, part of the cord 190 is shown in FIG. 4*e* and the rest in FIG. 4*f*, which combined show the whole path of continuous loop of cord 190 as shown in FIG. 4*d*. As shown in FIG. 4*e*, starting arbitrarily with cord 190 exiting the cord holder 80 on the right, cord 190 passes through the first right cord guide hole 29, loops around the right hook 180 of the cradle 140, passes through right rail base hole 26, under the rail 20 and up through left rail base hole 27, loops around the left hook 181, through first left entry hole 31, through the cord holder on the left. Then, as seen in FIG. 4*f*, the cord 190 goes through second left entry hole 33, through right rail base hole 26, under rail 20, up through left rail base hole 27, through the second right entry hole 35, to the cord holder 80 on the right. FIG. 4*c* shows the cord 200 running "under" the bottom rail 30. To create a continuous loop of cord, the cord could be knotted at one or both of the pairs of cord holders 80.

Figure 5A:
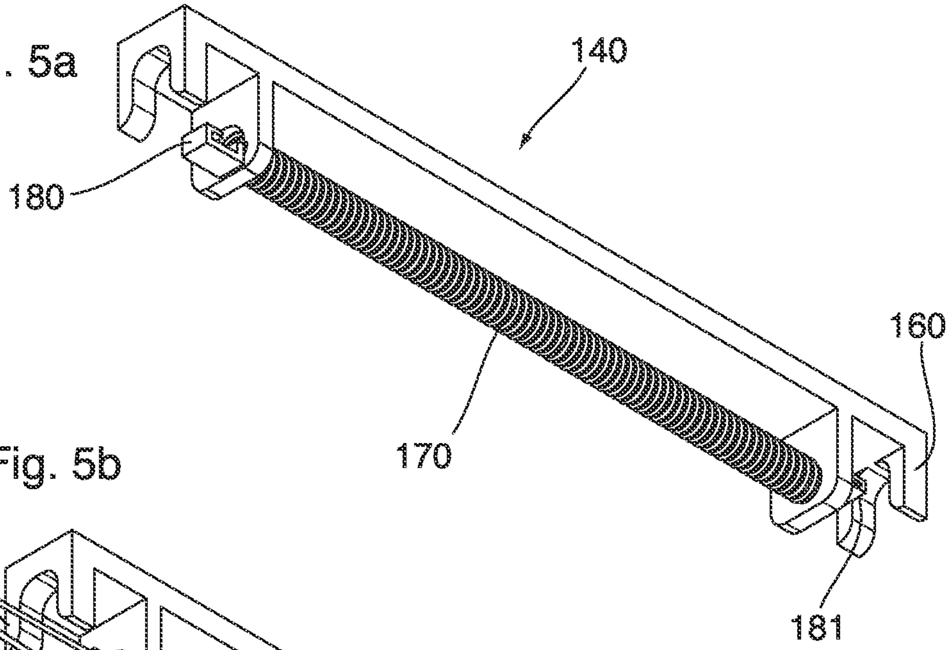
FIG. 5*a* is a perspective view of a cradle of an embodiment of a window covering of the present invention.
Figure 5B:
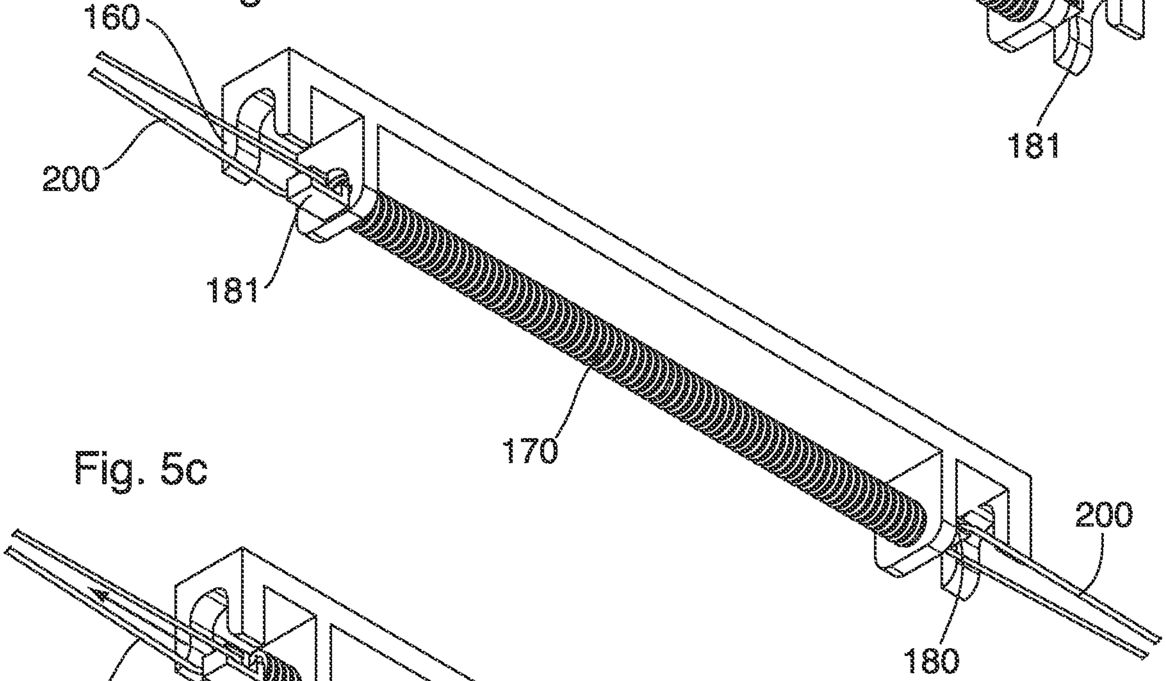
FIG. 5*b* is a perspective view of the cradle of FIG. 5*b* with a cord.
Figure 5C:
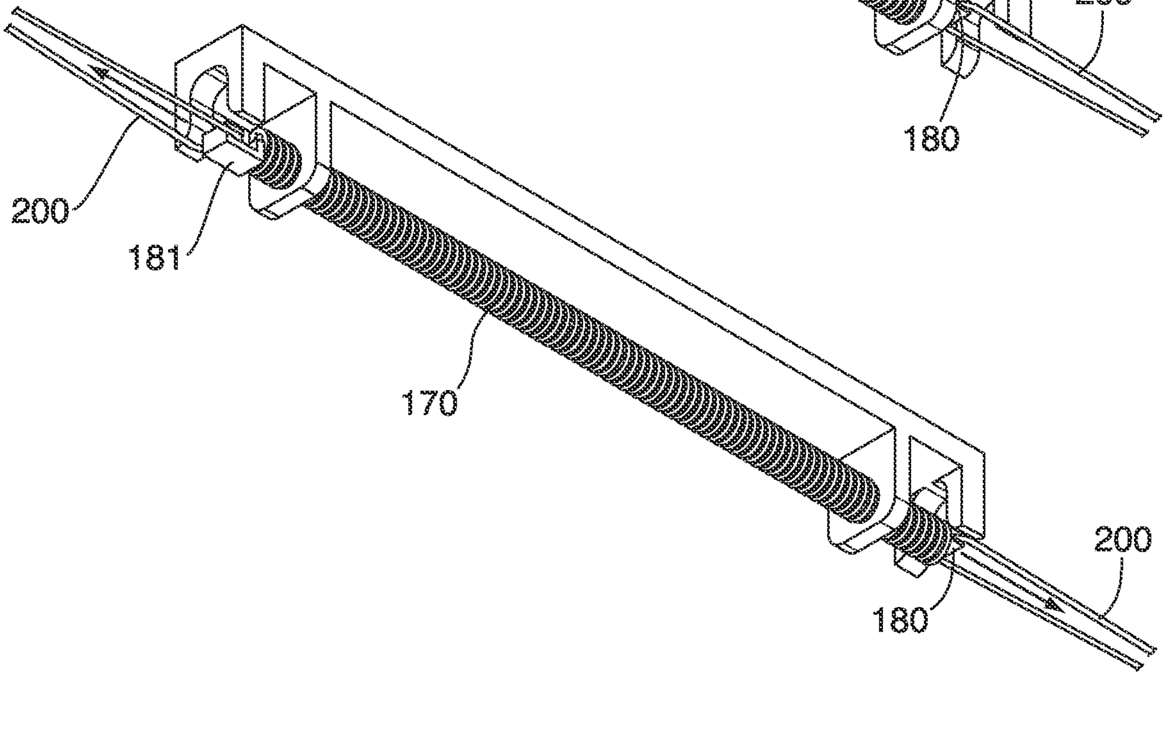
FIG. 5*c* is a perspective view of a cradle of FIG. 5*b* with more tension on the cord.

As shown in FIGS. 5*a* to 5*c*, the cradle 140 has a spring 170 with a hook 180, 181 at either end of the spring 170. The cradle 140 has a pronged grooves 160 at either end allowing the hook 180 181 to be pulled by a loop of cord 200 through the pronged grooves 160. When bottom rail 30 is pushed from a "closed" position from the bottom of the frame 50 towards the middle, which "opens" the panel 40, the loops of cord 200 around the hooks 180, 181 cause the spring 170 to be pulled at each end as shown in FIG. 5*c*.

The cord pulley system of the present invention keeps the panel 40 under tension and tight within the frame. This tension is maintained by having each respective cord 190, 200 held in the corners of the frame move down to the sides of each rail and attach to the spring 170 and the panel 40 connecting the two rails. If the panel 40 is fully extended in the frame or "closed", in the embodiment shown in the figures, the cord holders 80 hold the cord 190, 200 in the corners of the frame 50, the cord guide 28 holds the cord 190, 200 as it enters each end of the rail 20, 30 and the spring 170 in the top rail 20 is pulled by the cord 190 and lengthens when the top rail 20 is moved downwards from being adjacent to the top of the frame, and the spring 170 in the bottom rail is pulled by the cord 200 and lengthens when the bottom rail 30 is moved upwards from being adjacent to the bottom of the frame.

Figure 6A:
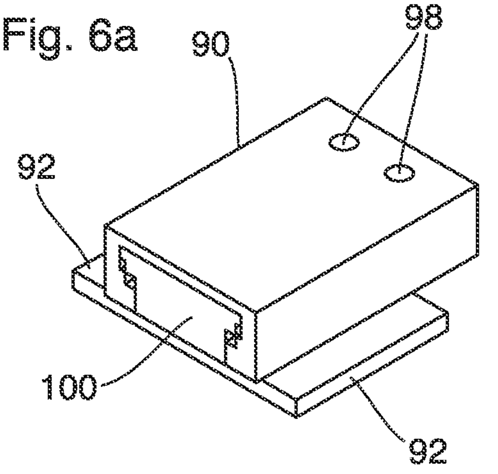
FIG. 6*a* is a top perspective view of a cord holder of the window covering of FIG. 1.
Figure 6B:
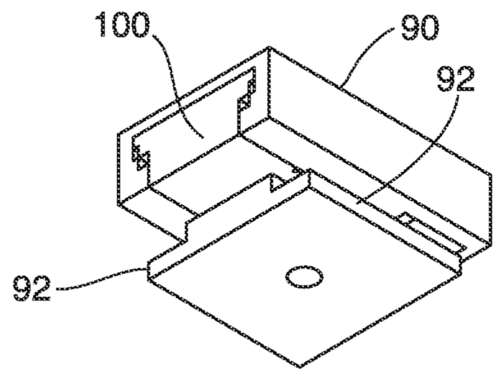
FIG. 6*b* is a bottom perspective view of the cord holder of FIG. 6*a*.
Figure 6C:
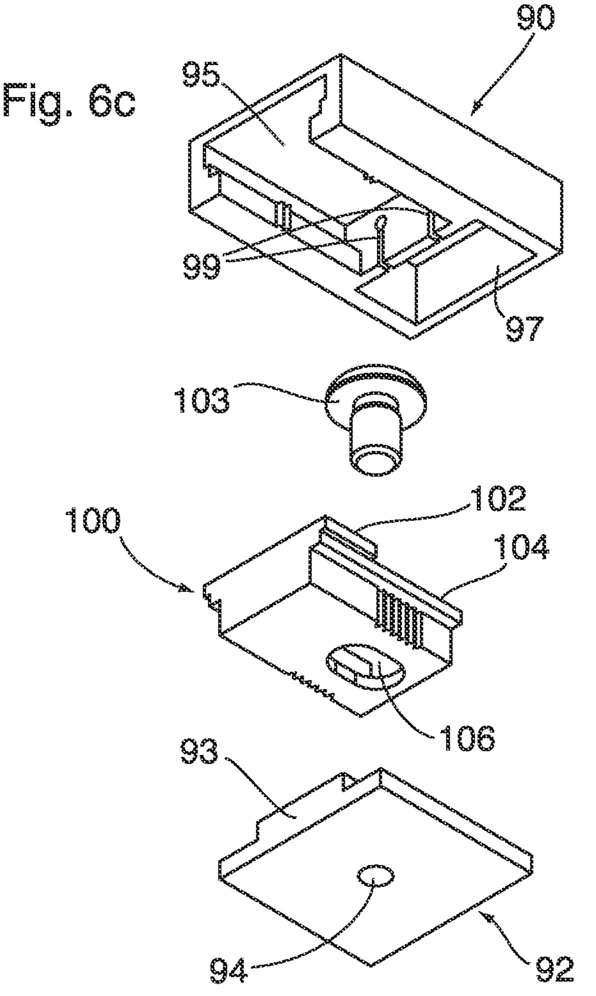
FIG. 6*c* is an exploded bottom perspective view of the cord holder of FIG. 6*a*.
Figure 6D:
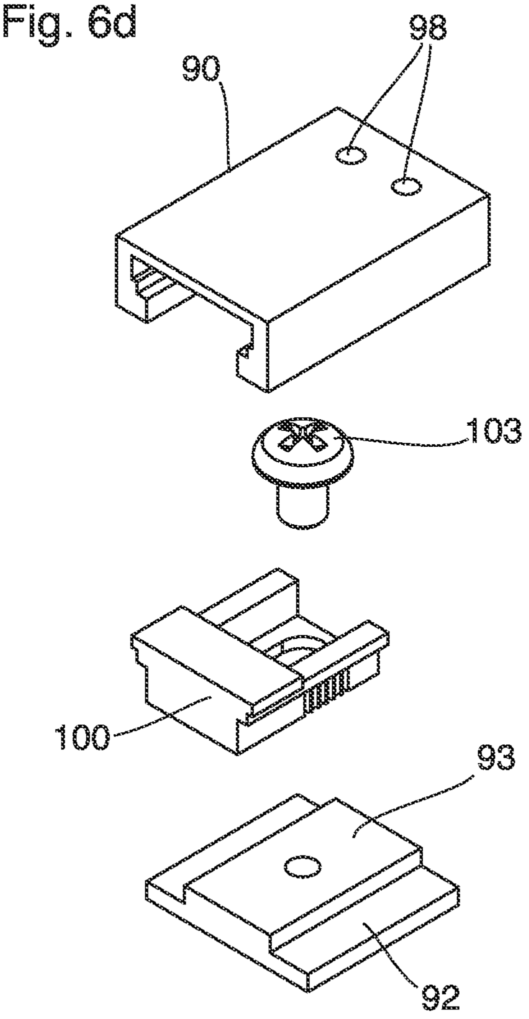
FIG. 6*d* is an exploded top perspective view of the cord holder of FIG. 6*a*.
Figure 6E:
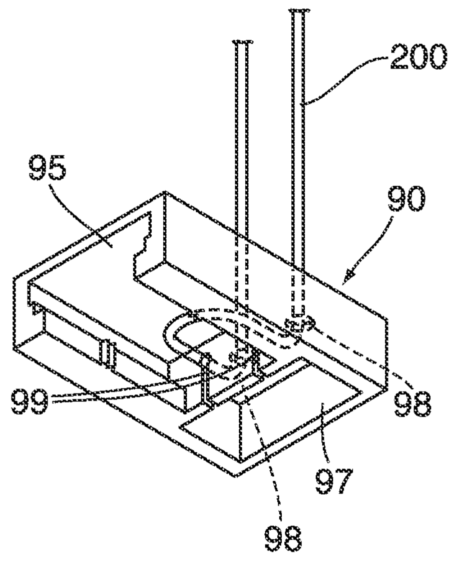
FIG. 6*e* is a bottom perspective view of the cap of the cord holder of FIG. 6*a* with a cord.
Figure 12A:
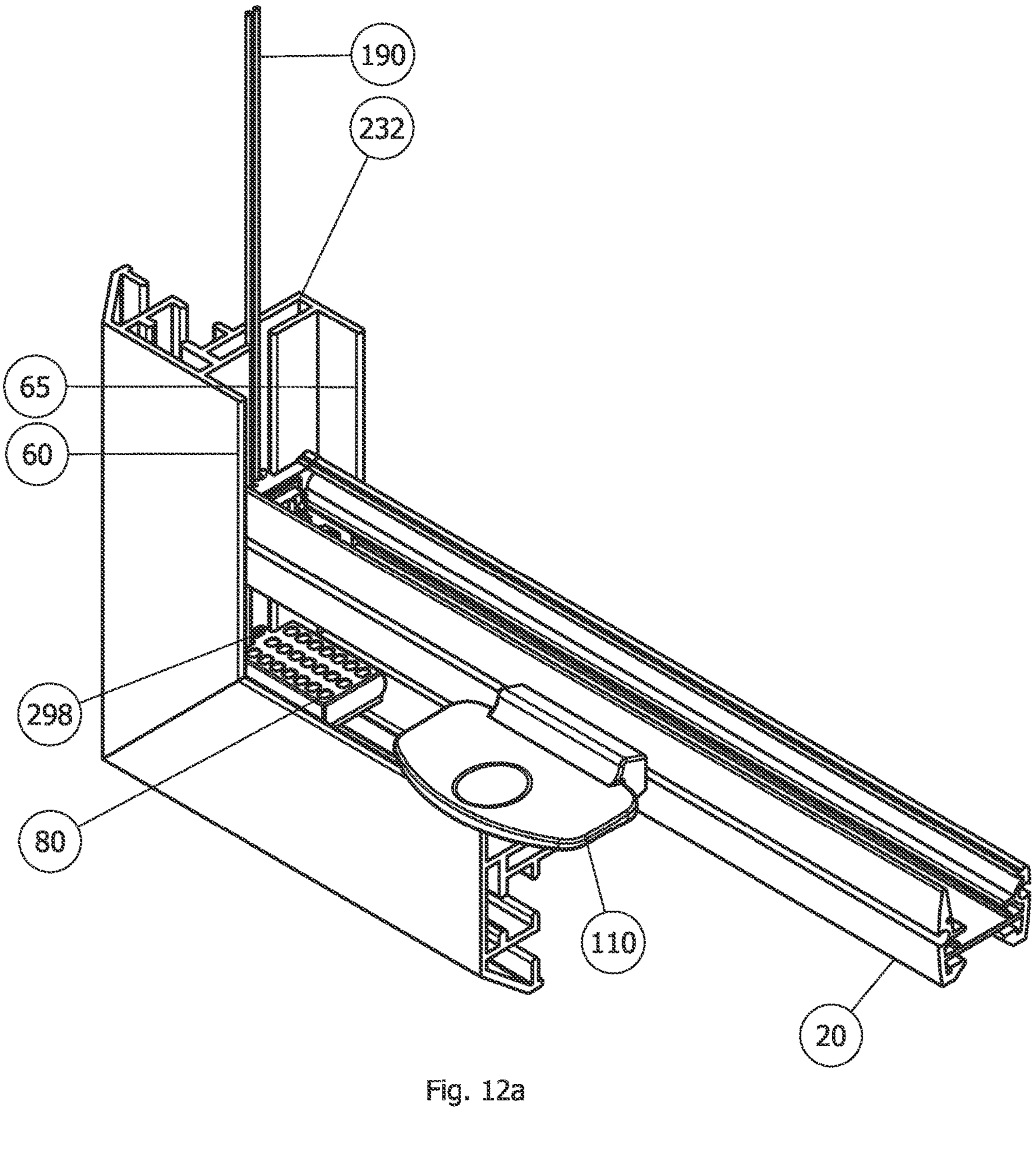
FIG. 12*a* is a perspective view of the top rail of FIG. 11 in a cutaway frame.

The cord holders 80 may be constructed in various ways and an embodiment shown in the FIGS. is further described by FIGS. 6*a* to 6*e*. It will be understood that other types of cord holders with any corresponding frame adjustments may be used. This cord holder 80 is comprised of a cap 90 and base 92 with joiner 100. The cap 90 comprises a channel 95 and cord recess 97 with two cord holes 98. As shown in FIG. 6*e*, a cord 200 goes into cap 90 through a cord hole 98 into cord recess 97, through a cord slot 99, then into the other cord slot 99 and out through the other cord hole 98. This is the same for cord 190. The joiner 100 comprises a joiner hook 102 and channel slide 104 shaped to fit in the channel 95 of the cap, and also has a screw hole 106 for screw 103. The base 92 and joiner 100 could be one contiguous piece. Alternatively, the cord holder 80 may have one hole 298 as shown in FIG. 12*a*.

Figure 7A:
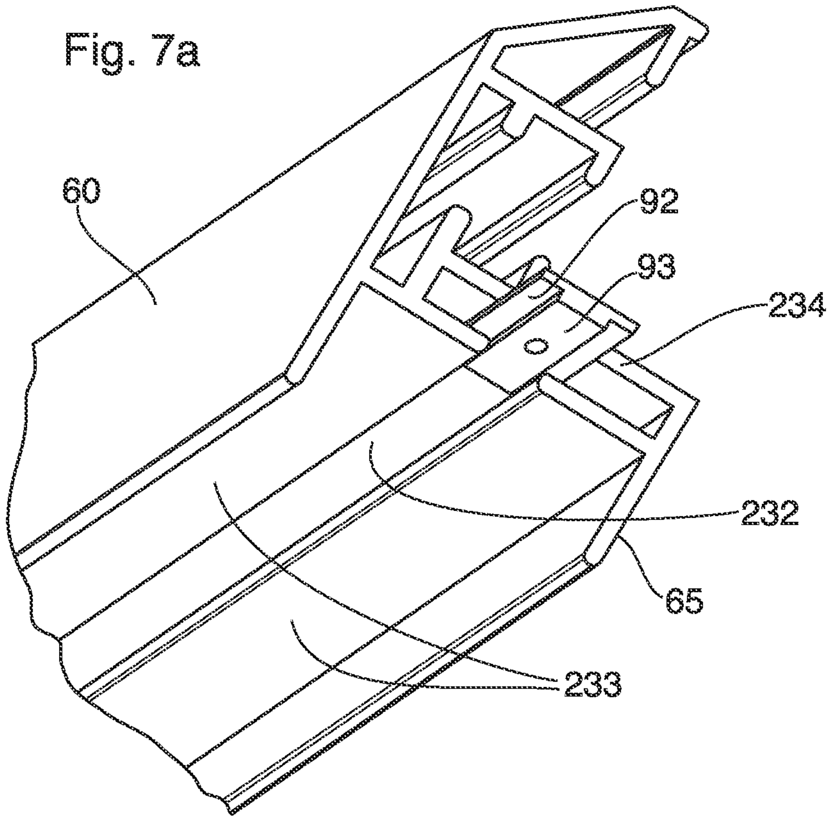
FIG. 7*a* is a close-up view of a corner of a short frame side of the window covering of FIG. 2 with base installation.
Figure 7B:
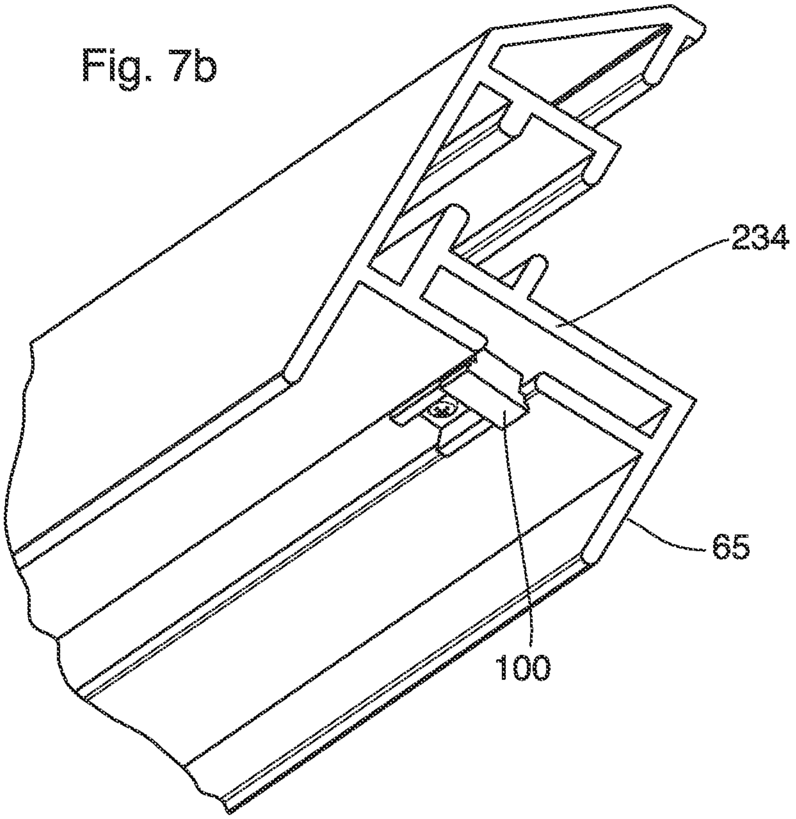
FIG. 7*b* is a close-up view of the short frame side of FIG. 7*a* with base and joiner installed.
Figure 7C:
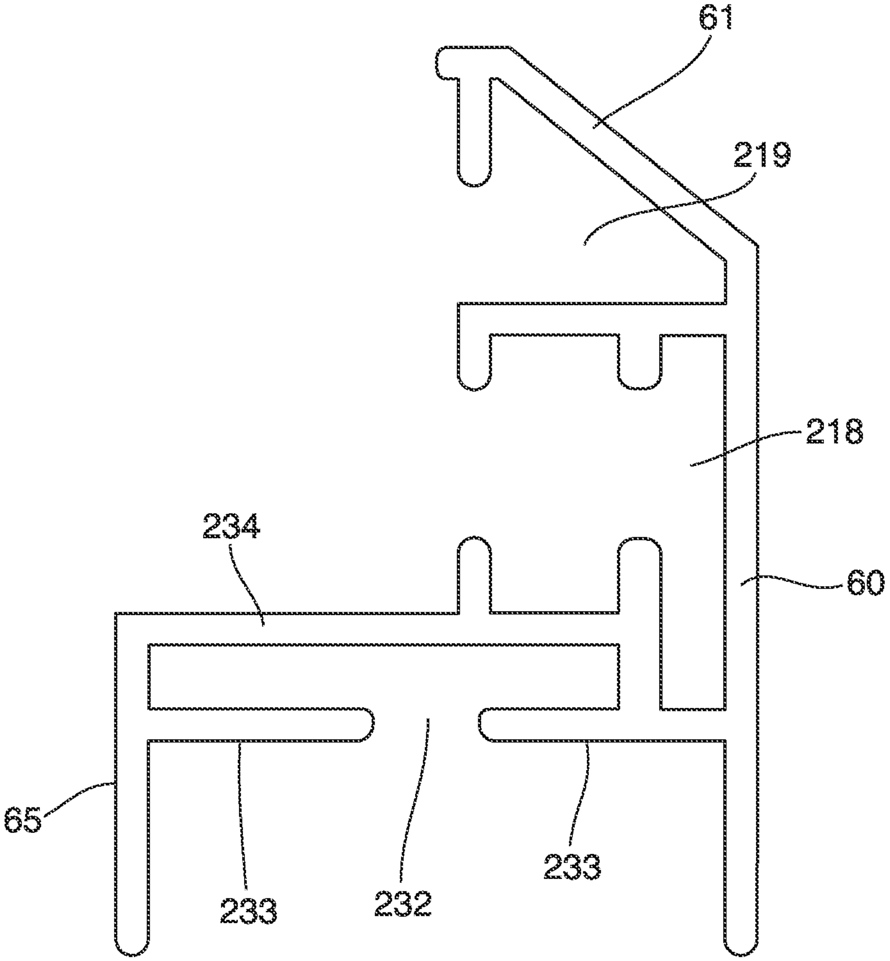
FIG. 7*c* is a profile view of the frame of FIG. 7*a*.
Figure 7D:
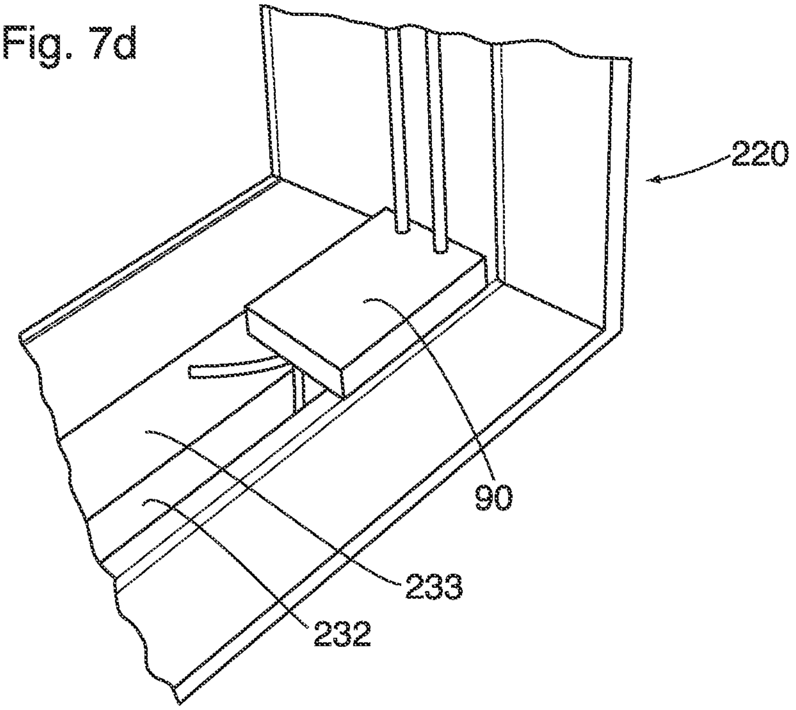
FIG. 7*d* is close-up view of the cord holder in the frame of the window covering of FIG. 1.

To show how these cord holders 80 are held in the corners of the frame 50, meaning on the short frame sides 230 abutting the long frame sides 220, an embodiment of the frame 50 is shown in FIGS. 7*a*, 7*b*, 7*c* and 7*d*. On the inner aspect of the frame 50 there are two slats 233 between which is a cord holder channel 232. As shown in FIG. 7*a*, the base 92 slides between the slats 233 and base rest 234 into the cord holder channel 232, with the base platform 93 accessible above the cord holder channel 232. A cord holder screw 103 passes through a screw hole 106 in the joiner 100 and into base hole 94 in the base 92 and when tightened keeps the joiner 100 on the base 92. As shown in FIG. 7*d*, the cap 90 then slides onto the joiner 100 (no longer visible). In the window covering 10, the cord holders 80 are oriented so that the cord holes 98 of the caps 90 are adjacent the inner aspect of the frame 50 of the long frame sides 220.

The tension on the cords 190, 200 running from the cord guides 28 to the cord holders 80 maintain the cord holders in position on the frame 50. It will be understood that other embodiments of cord holders and frames, the cord holders could be screwed into a frame.

Within the inner aspect of the depth and width of the frame 50 fit rails 20, 30, and a panel 40 can stretch between rails lengthwise from a top short frame side 230 to a bottom short frame side 230. The window covering may be custom made to fit the door or window frame to be covered. Also, the frame and rail size could be adjusted to accommodate typical cellular (honeycomb) panels with cell sizes (the size of the diamond or honeycomb shape between two fabrics) of 20 mm, 25 mm, 32 mm, 38 mm and 45 mm, and other sizes or future standard sizes.

Figure 7E:
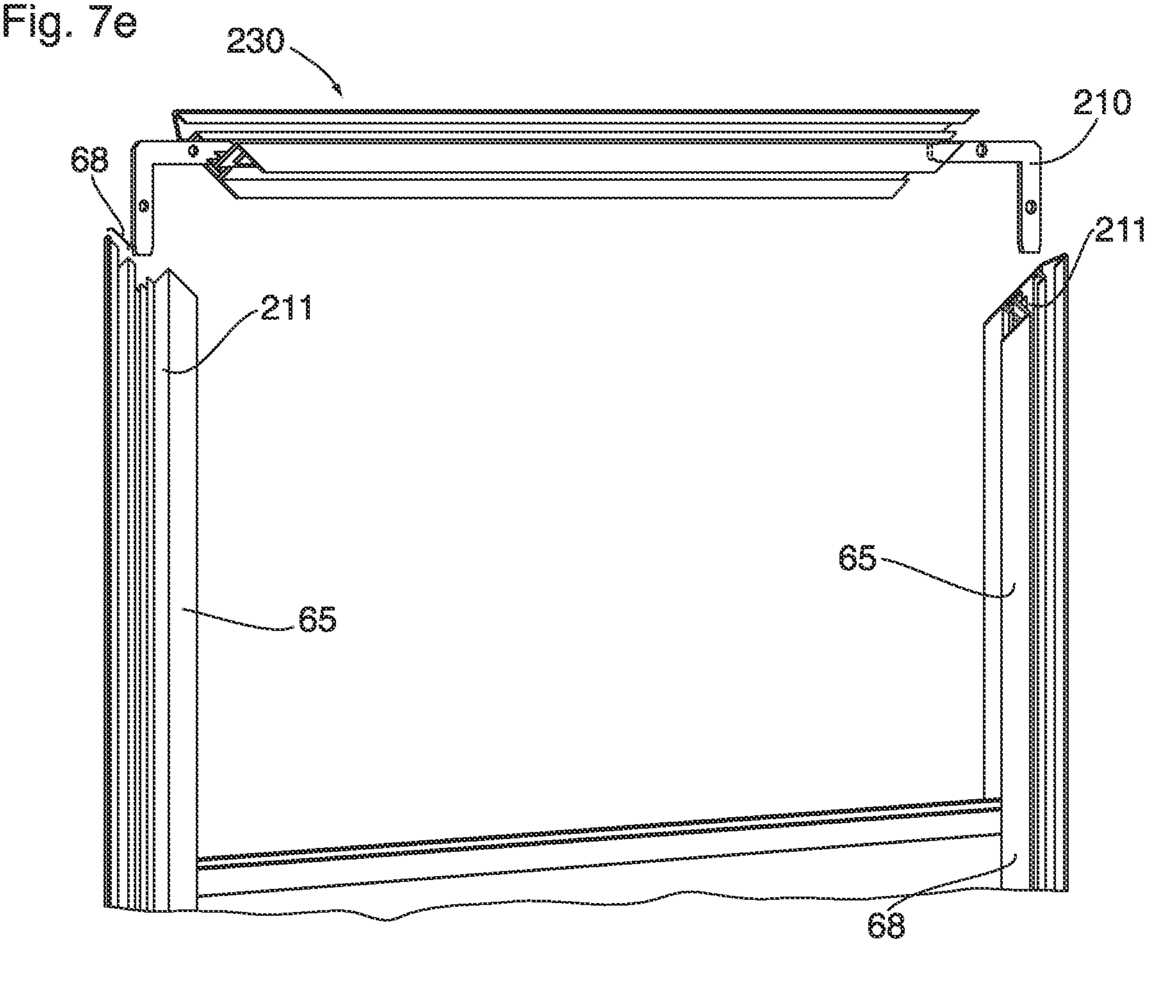
FIG. 7*e* is a close-up view of the back of the frame of the window covering of FIG. 2.

As shown from the back in FIG. 7*e* the frame 50 may be assembled by preassembling long frame sides 220 and short frame sides 230, and then joining short frame sides 230 with corner keys 210 in the corner key grooves 211 into the corner key grooves 211 in long frame sides 230. The corner keys 210 may be made of metal, plastic, fiberglass, wood, or other materials to suitably fasten the perimeter of the frame securely.

The frame 50 may be made of any suitable material such as aluminum, metal, plastic, fiberglass, wood, or other materials.

Figure 7F:
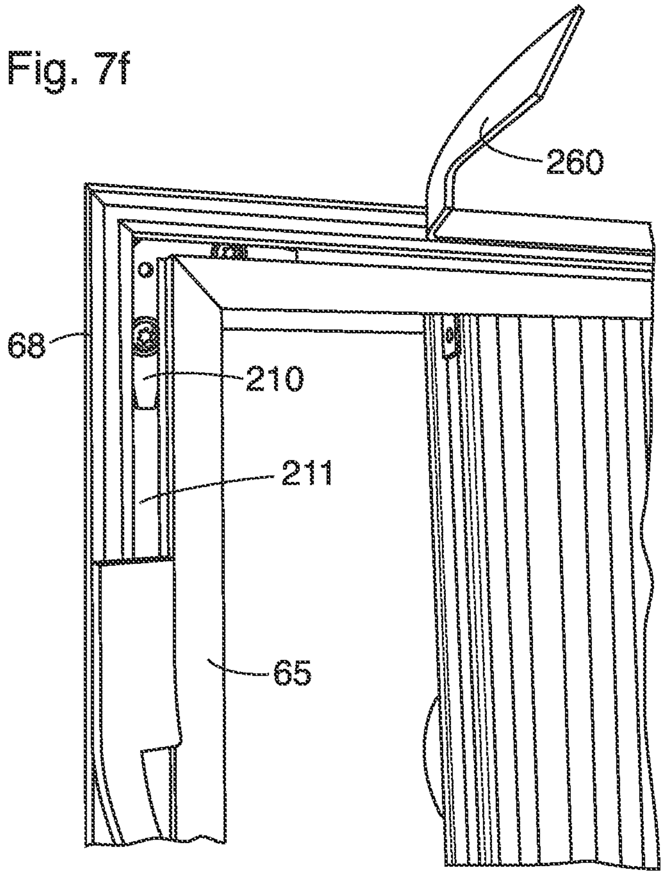
FIG. 7*f* is close-up view of the frame of the window covering of FIG. 7*e* with application of attachment means.
Figure 7G:
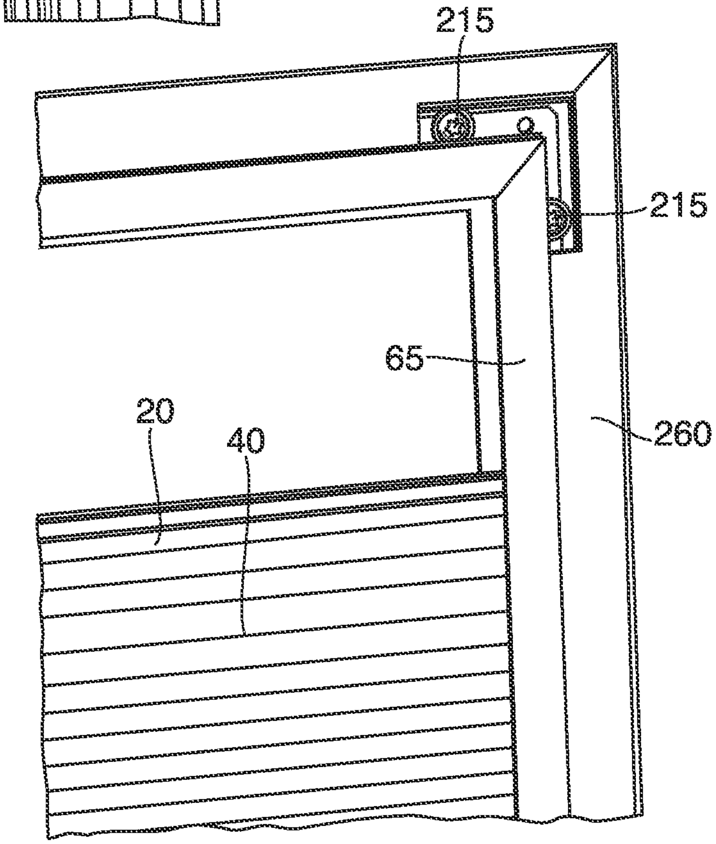
FIG. 7*g* is close-up view of the frame of the window covering of FIG. 7*e* with attachment means.

As shown in FIG. 7*f*, an attachment means 260 may be secured to the outer back frame 68. As seen in FIG. 7*g*, this attachment means 260 may be size to give a finished appearance to the back of the frame 50 by covering over outer back frame 68. The corner key 210 and corner key screws 215 (which tighten the long frame side 220 to the short frame side 230) are recessed in the corner key grooves 211.

Figure 7H:
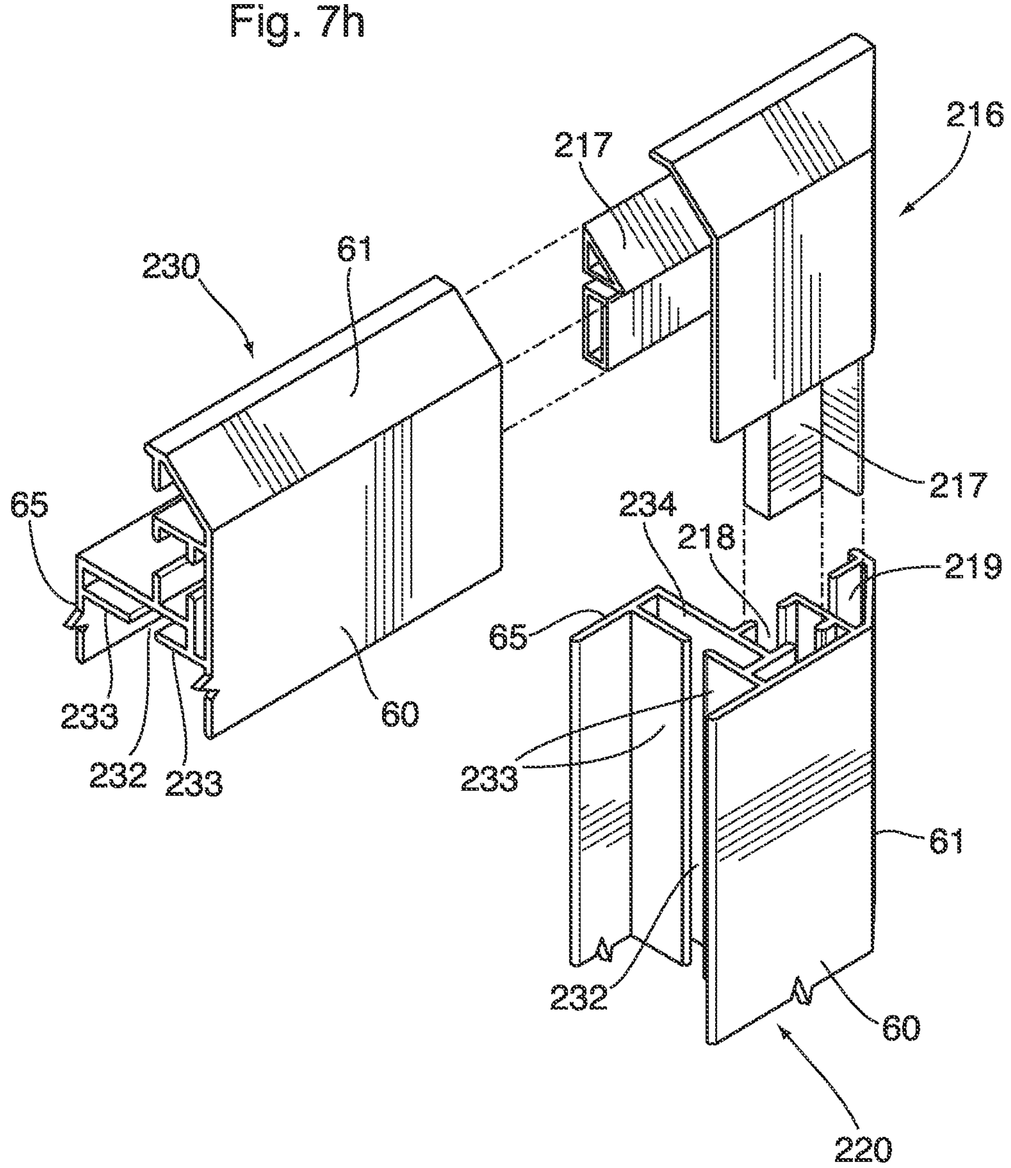
FIG. 7*h* is an exploded, perspective view of a frame corner, according to an alternate embodiment of the invention.

It will be understood that variations of the frame may be used with the dual cord pulley system of the present invention. For example, as shown in FIG. 7*h*, In an alternate embodiment of the invention, each corner of the frame comprises a corner cover 216 having two corner cover inserts 217 extending from the corner cover at right angles. Instead of the frame corners being mitered, the ends of each frame side 220, 230 are straight cut. The corner cover inserts 217 are shaped to insert into the first frame slot 218 and second frame slot 219 formed in the frame ends to join adjacent frame sides 220, 230 together. The seams between the corner cover 216 and frame sides 220, 230 may be sealed to have an aesthetically finished appearance.

Figure 8A:
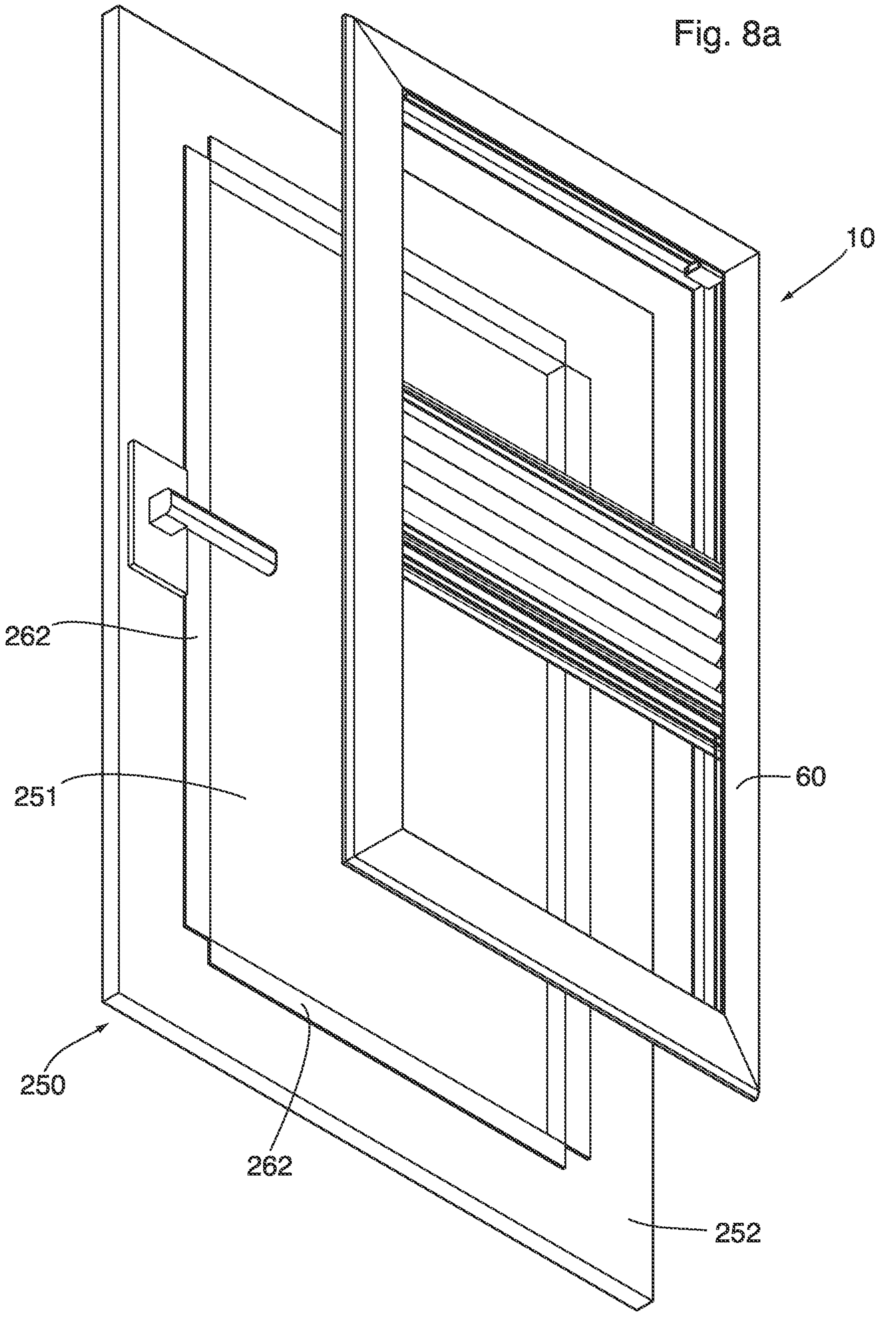
FIG. 8*a* is a front perspective view of the window covering of FIG. 1 with a window opening.
Figure 8B:
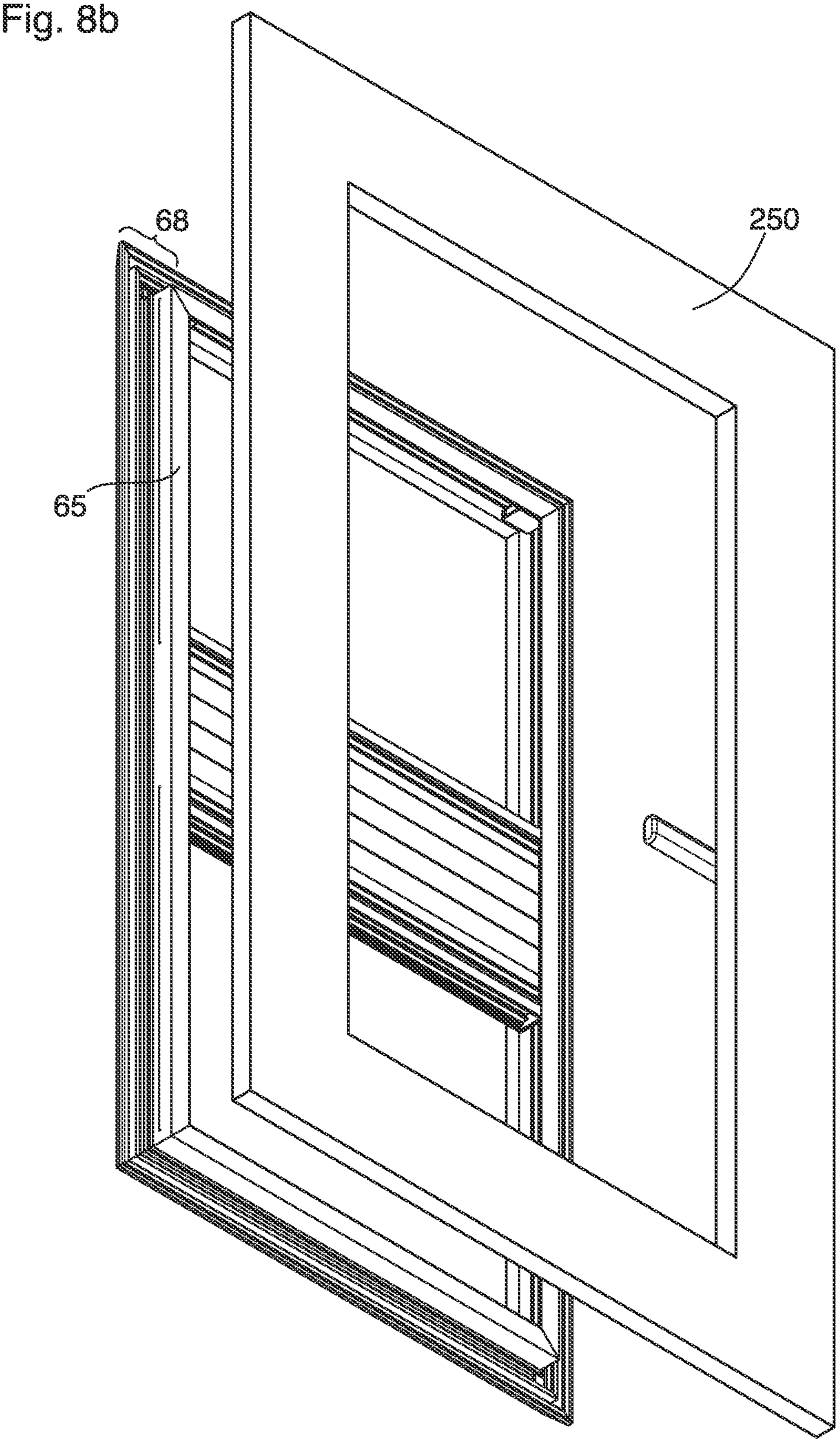
FIG. 8*b* is a back perspective view of the window covering with a window opening of FIG. 10*a*.

As shown in FIGS. 8*a* and 8*b* the window covering 10 is made to measure for the window frame opening 251 of the window frame 250 to be covered. The inner back frame 65 abuts the window frame opening 251 when the outer frame 68 is attached to the front window frame face 252. Various simple means, such as gluing, may be used to affix the window covering to a door or window frame and no mounting brackets are required or needed. An example for window covering attachment means 260 or window frame attachment means 262 are pieces of two-sided sticking tape. Another example is magnetic strip tapes 260 stuck on the outer back frame 68 with corresponding magnetic strip 262 around the front window frame face 252. A further example is a window covering attachment means 260 comprising a strip of either hooks or loops on the outer back frame 68 with frame attachment means 262 comprising a strip of corresponding loops or hooks around the front window frame face 252. The magnetic strips and hook and loop strips both enable easy attachment and removal of the window covering 10. It will be understood that double sided tape, glue and dap (or other adhering materials) could also be used to adhere the window covering 10 to a window or door opening (or vice versa) for a permanent or semi-permanent affixing. No installation brackets are required, and no drilling is required although these methods could be used. Other window coverings require brackets for installation and/or attachment to a window. Drilling into a window may cause damage to it and puncturing a window frame may cause the window to later crack in the cold of winter, and generally any drilling or tampering with a window or door will void any manufacturer's warranty.

Figure 9:
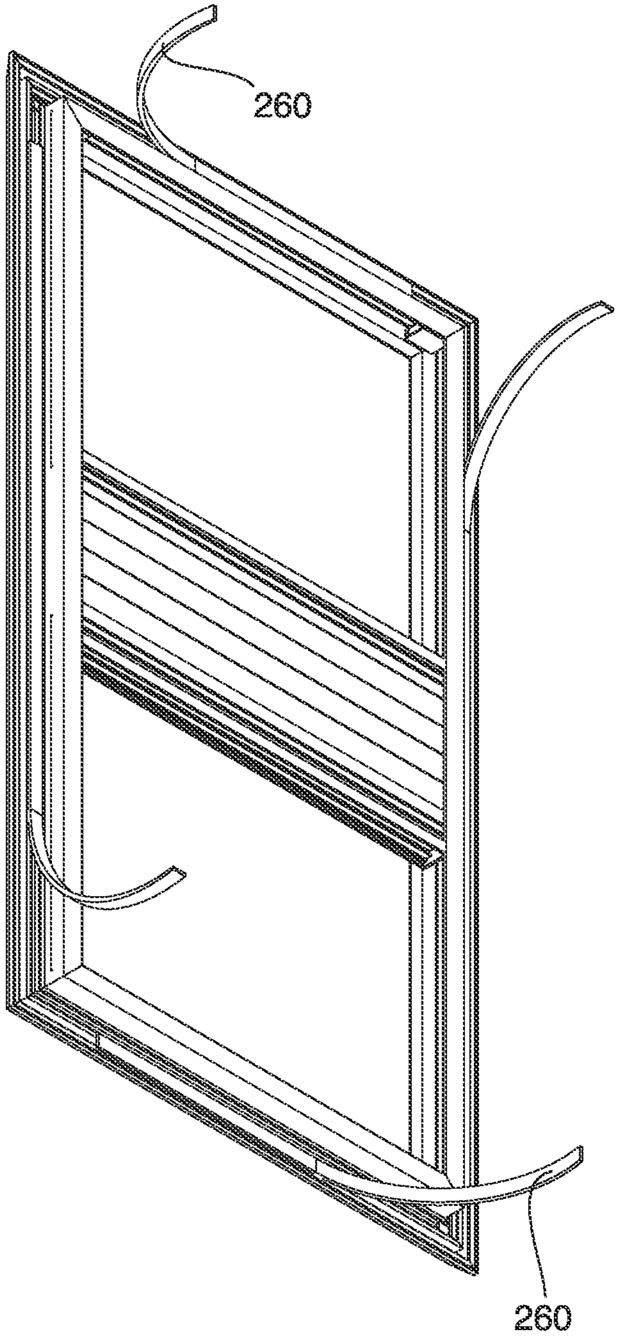
FIG. 9 is a front perspective view of the window covering of FIG. 1 with attachment means.

It will be understood that alternatively an aesthetically pleasing covering could be added to cover back frame 68 and then any attachment means 260 could be added afterwards. In the embodiment shown in FIG. 9 the attachment means 260 is not for aesthetic purposes.

The window covering 10 may be installed over a window frame vertically with the top rail 20 above the bottom rail 30, or with the bottom rail 30 above the top rail 20. The window covering may also be used in either orientation on an angle or horizontally, for example over a skylight. The window covering 10 could even be used horizontally rather than vertically or in any orientation or angle since the panel 40 remains in the frame 50.

The window covering 10 can be installed by users without the need of a professional installer. The window covering of the present invention can be opened at the bottom or top or both the top and bottom by virtue of the cordless pulley systems, is installable without brackets, and doesn't need to have an aesthetically unpleasing larger top than bottom rail, although it could have different sized rails if desired.

In operation, the window covering of the present invention installed vertically over a window opening may be raised and lowered by a user from either the top rail 20, the bottom rail 30, or both the top rail 20 and the bottom rail 30. A user of the window covering grasps the rail to be moved either up or down, or a handle 110 attached to the rail, and either raises or lowers the rail(s). For example, a window covering 10 in which the panel 40 covers the entire window opening, a user that wishes to see out of the top of the window will pull down the top rail 20.

Figure 10B:
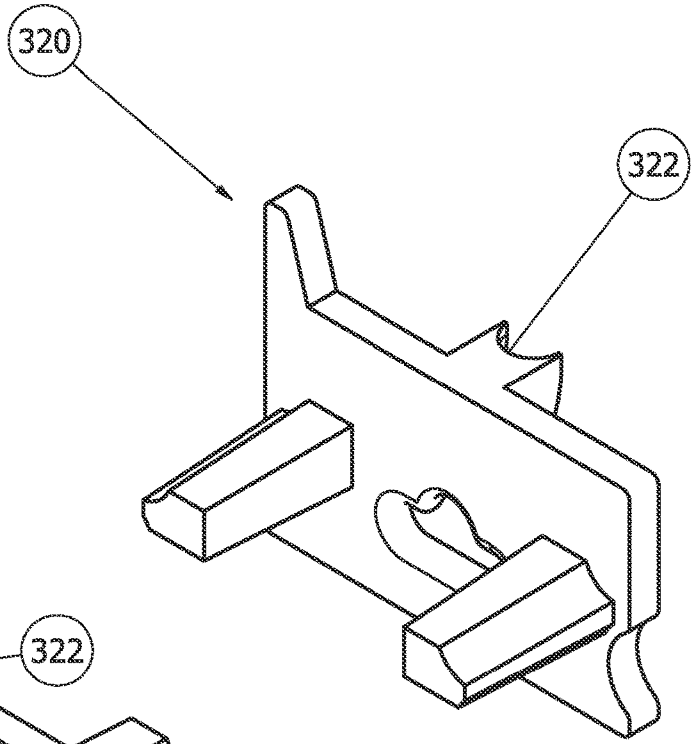
FIG. 10*b* is a back perspective view of the grooved end plate of FIG. 10*a*.
Figure 10A:
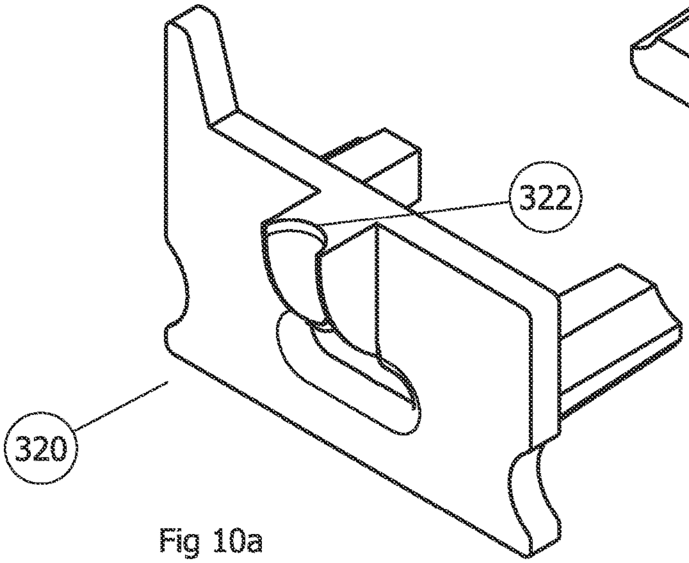
FIG. 10*a* is a front perspective view of a grooved end plate of an embodiment of the present invention.
Figure 11:
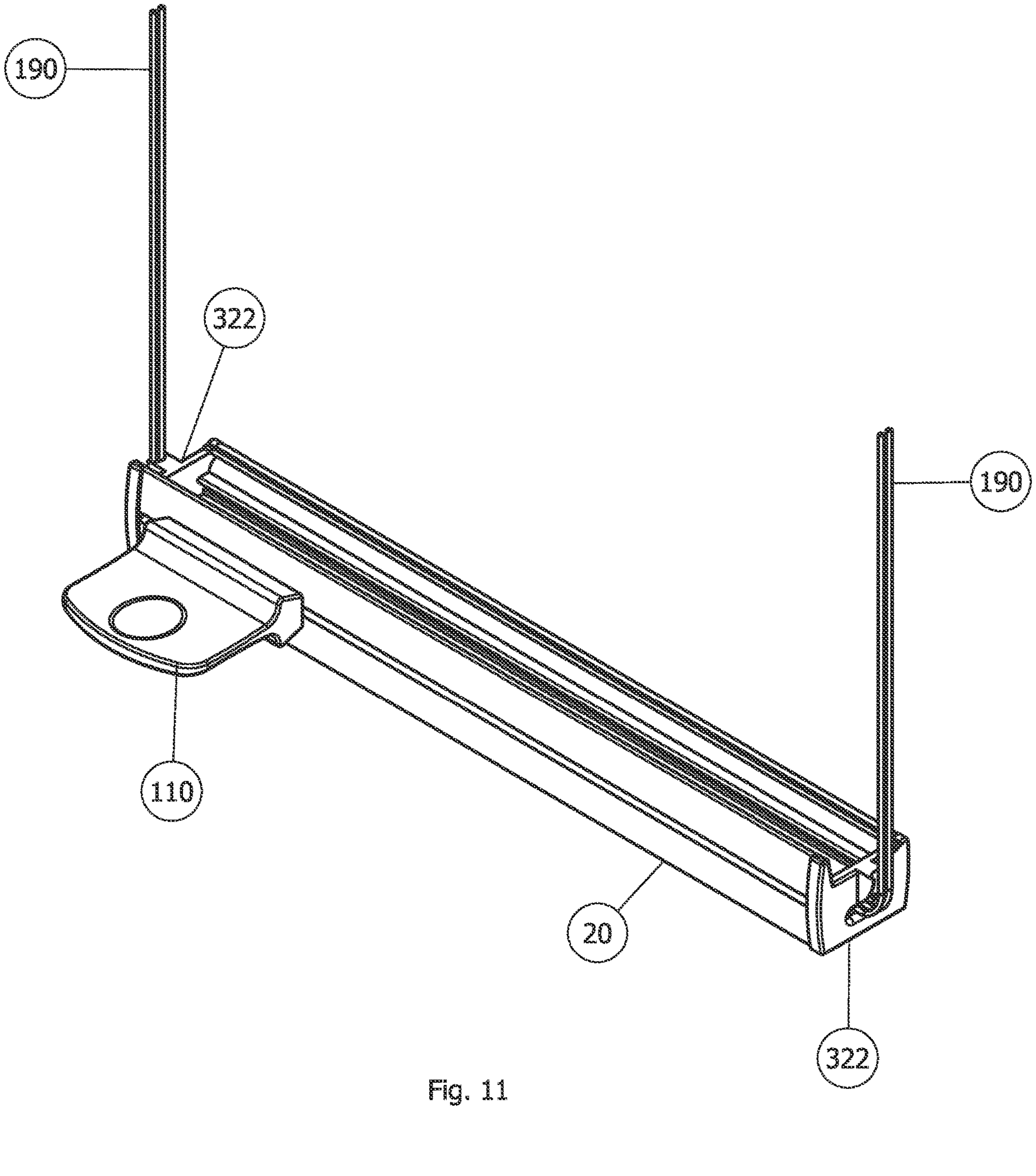
FIG. 11 is a top rail with the grooved end plate of FIG. 10*a*.

In another embodiment of the end plate 120 of the present invention, there is a grooved end plate 320 with a groove 322 as shown in FIGS. 10*a* and 10*b*. As seen in FIG. 11, on exiting either end of the top rail 20 the cords 190 fit into the groove 322 in each respective grooved end plate 320.

Figure 12B:
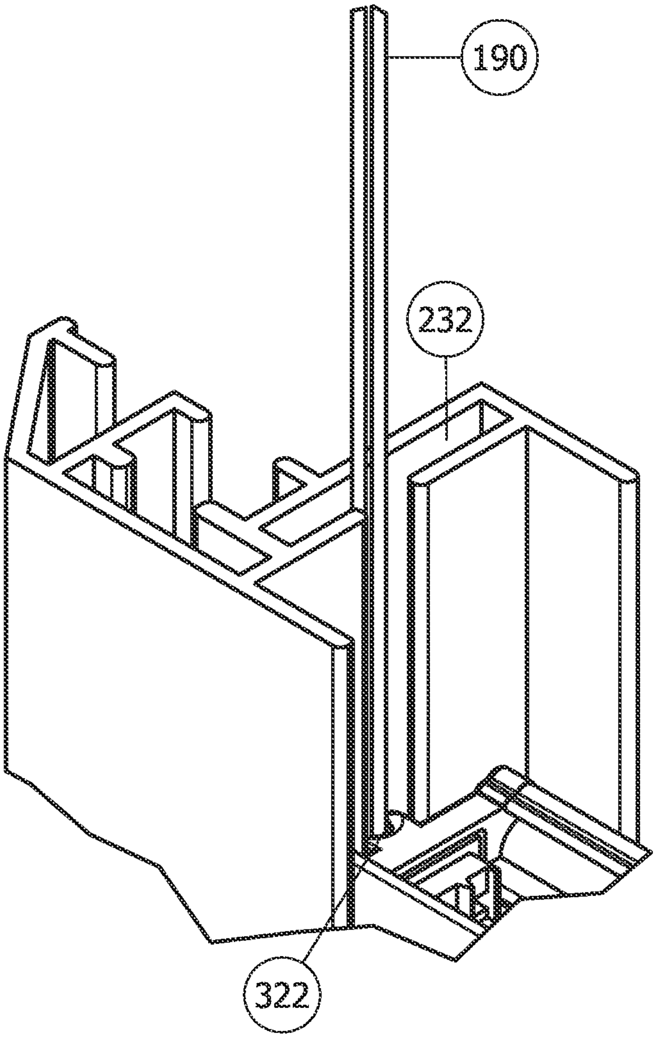
FIG. 12*b* is a perspective view of part of the frame of FIG. 12*a* enlarged by twice.

In FIGS. 12*a* and 12*b*, the effect of the groove 322 is to push the cords 190 farther into the cord holder channel 232 where they are inaccessible. FIG. 12*a* demonstrates that the cords 190 are not accessible since the groove 322 of the grooved end plate 320 directs the cords 190 back within the channel 232 of the frame 50. In FIG. 12*a*, the bottom rail 30 is not shown in order to show a further embodiment of a cord holder 80 in which there is a cords hole 298 rather than two cord holes 98 since the groove 322 pushes the set of cords 190 together. The cord holder 80 is shaped so that the cords hole 298 pushes the cord into the channel.

It will be understood that in this embodiment of the window covering 10 that the bottom rail 30 also has a grooved end plate 320 at either end.

While embodiments of the invention have been described in the detailed description, the scope of the claims should not be limited by the preferred embodiments set forth in the examples, but should be given the broadest interpretation consistent with the description as a whole.

What is claimed is:

1. A window covering comprising:
- a frame;
- a panel section inside the frame;
- a first cord pulley system; and
- a second cord pulley system,
- wherein the frame has a front, a back, four sides, a top right corner, a top left corner, a bottom right corner, and a bottom left corner,
- wherein there is a cord holder in the top right corner, the top left corner, the bottom right corner and the bottom left corner,
- wherein the panel section comprises a top rail and a bottom rail with a panel in between,
- wherein the top rail comprises a top rail right end and a top rail left end and a top rail base with a top rail right base hole and a top rail left base hole,
- wherein the first cord pulley system comprises a first cord forming a continuous loop, the cord holder in the top right corner and the cord holder in the top left corner, a spring in the base of the top rail, which spring has a right hook at one end and a left hook at the other end,
- wherein the first cord exits the cord holder in the top right corner, enters into the right end of the top rail, loops around the right hook of the spring, down through the top rail right base hole, under the top rail, up through the top rail left base hole, loops around the left hook of the spring, exits out the left end of the top rail, enters the cord holder in the top left corner, exits the cord holder in the top left corner, enters in through the left end of the top rail, through the top rail right base hole, under the top rail, up through the top rail left base hole, exits out through the right end of the top rail, and enters the cord holder in the top right corner, and
- wherein the bottom rail has the same components as the top rail, that is a bottom rail right end and a bottom rail left end and a bottom rail base with a bottom rail right base hole and a bottom rail left base hole, and the second cord pulley system with a second cord has the same components as the first cord pulley system, that is a second cord forming a continuous loop, a cord holder in the bottom right corner and a cord holder in the bottom left corner, a spring in the base of the bottom rail, which spring has a right hook at one end and a left hook at the other end, with the first cord and the bottom rail being oriented upside down so that the second cord for the bottom pulley system forms a continuous loop with the cord holder in the bottom right corner and the cord holder in the bottom left corner.

2. The window covering of claim 1, wherein the frame additionally comprises an open inner channel.

3. The window covering of claim 2, additionally comprising four grooved end plates wherein each said grooved end plate comprises a hole above a groove, and one grooved end plate is at each of the right end and the left end of the top rail and the right end and the left end of the bottom rail, and the first cord enters the hole and extends along the groove of each grooved end plate of the top rail when the first cord enters the right end of the top rail and the left end of the top rail, wherein the grooves direct the first cord into the channel, and the second cord enters the hole extends and along the groove of each grooved end plate of the bottom rail when the second cord enters the right end of the bottom rail and the left end of the bottom rail, wherein the grooves direct the second cord into the channel.

4. The window covering of claim 3, wherein each of the cord holders additionally comprise a base capable of slidable engaging with the channel and each cord holder has one or two holes for the cord to enter and exit.

5. The window covering of claim 4, additionally comprising two cradles, a top rail cradle and a bottom rail cradle, and wherein each cradle holds one of the springs.

6. The window covering of claim 5, additionally comprising a cover to cover each of the top rail and the bottom rail, and wherein each cover has a hole at the right end of the top rail and the right end of the bottom rail and a hole at the left end of the top rail and the left end of the bottom rail for the cords to pass through and wherein the top rail and the bottom rail are the same size.

7. The window covering of claim 6, wherein each of the top right corner, the top left corner, the bottom right corner and the bottom left corner is mitered and has a corner key groove with a corner key inserted into the corner key groove so as to line up the corner key groove of adjacent frame sides, and wherein there is a tightened screw in each of the corner keys.

8. The window covering of claim 7, in which the frame back additionally comprises a window covering attachment means for attaching the back of the frame to a frame for a door or window.

9. The window covering of claim 8, in which the window covering attachment means is selected from double sided tape and glue.

10. The window covering of claim 8, in which the window covering attachment means is a magnetic strip capable of magnetically attaching to a corresponding magnetic strip on the frame.

11. The window covering of claim 8, in which the window covering attachment means comprises hooks when the frame for a door or window comprises corresponding loops and the window attachment means comprises loops when the frame for a door or window comprises corresponding hooks, and the hooks and the loops which-adhere when pressed together and can also be pulled apart.

12. The window covering of claim 8, further comprising a handle on the top rail and a handle on the bottom rail.

13. The window covering of claim 12 in which the panel is of a honeycomb style.

14. The window covering of claim 6, wherein each of the top right corner, the top left corner, the bottom right corner and the bottom left corner of the frame comprises a corner cover having two corner cover inserts extending from the corner cover at right angles, and wherein each frame side ends in a straight cut with a corner cover insert in the end of each frame side to join adjacent frame sides together.

* * * * *